United States Patent
Yokohata

(10) Patent No.: US 8,421,887 B2
(45) Date of Patent: Apr. 16, 2013

(54) IMAGE SENSING APPARATUS

(75) Inventor: Masahiro Yokohata, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 376 days.

(21) Appl. No.: 12/641,965

(22) Filed: Dec. 18, 2009

(65) Prior Publication Data

US 2010/0157105 A1 Jun. 24, 2010

(30) Foreign Application Priority Data

Dec. 19, 2008 (JP) ................................ 2008-324384

(51) Int. Cl.
*H04N 5/262* (2006.01)

(52) U.S. Cl.
USPC ...................................................... 348/240.1

(58) Field of Classification Search ............. 348/240.99, 348/240.1, 240.2, 240.3, 143, 169, 170
See application file for complete search history.

(56) References Cited

U.S. PATENT DOCUMENTS

| | | | | |
|---|---|---|---|---|
| 5,325,206 | A * | 6/1994 | Fujita et al. | 348/347 |
| 5,684,532 | A * | 11/1997 | Ely | 348/240.99 |
| 5,835,641 | A * | 11/1998 | Sotoda et al. | 382/291 |
| 6,507,366 | B1 | 1/2003 | Lee | |
| 6,704,048 | B1 * | 3/2004 | Malkin et al. | 348/240.2 |
| 6,993,158 | B2 * | 1/2006 | Cho et al. | 382/103 |
| 7,248,286 | B2 * | 7/2007 | Cho | 348/208.14 |
| 2001/0040636 | A1 * | 11/2001 | Kato et al. | 348/333.03 |
| 2005/0174362 | A1 * | 8/2005 | Lee et al. | 345/660 |
| 2008/0024620 | A1 * | 1/2008 | Yoshida et al. | 348/222.1 |
| 2009/0135275 | A1 * | 5/2009 | Imata | 348/240.99 |

FOREIGN PATENT DOCUMENTS

| | | |
|---|---|---|
| JP | 60-173515 A | 9/1985 |
| JP | 11-308517 A | 11/1999 |
| JP | 2005269153 | 9/2005 |
| JP | 2006-115525 A | 4/2006 |
| JP | 2006-215128 A | 8/2006 |
| JP | 2007027971 | 2/2007 |
| JP | 2007-74503 A | 3/2007 |

OTHER PUBLICATIONS

Yoav Freund & Robert E. Schapire; A Decision-theoretic Generalization of On-Line Learning and An Application to Boosting; Sep. 20, 1995.
Japanese Office Action issued Nov. 27, 2012 in corresponding Japanese application No. 2008.324384.
English Abstract for JP 60-173515 A, published Sep. 6, 1985.
English Abstract for JP 2007-74503 A, published Mar. 22, 2007.
English Abstract for JP 2006-115525 A, published Apr. 27, 2006.
Japanese Office Action issued Feb. 26, 2013 in corresponding Japanese application No. 2008.324384.
English Abstract for JP 2006-215128 A, published Aug. 17, 2006.

* cited by examiner

*Primary Examiner* — Aung S Moe
*Assistant Examiner* — Chriss Yoder, III
(74) *Attorney, Agent, or Firm* — NDQ&M Watchstone LLP

(57) ABSTRACT

A clipping processing portion is provided with: a main subject detection portion which detects the location of a main subject from an input image; a clip region setting portion which sets the clip region that is a region including the main subject; and a clipping portion which clips an image of the clip region from the input image to produce a clipped image. There is further provided a zoom control portion which controls the optical zoom magnification of the image sensing portion based on the clip region set by a clip region setting portion, and the optical zoom magnification is controlled such that the input image has an appropriate angle of view.

1 Claim, 14 Drawing Sheets

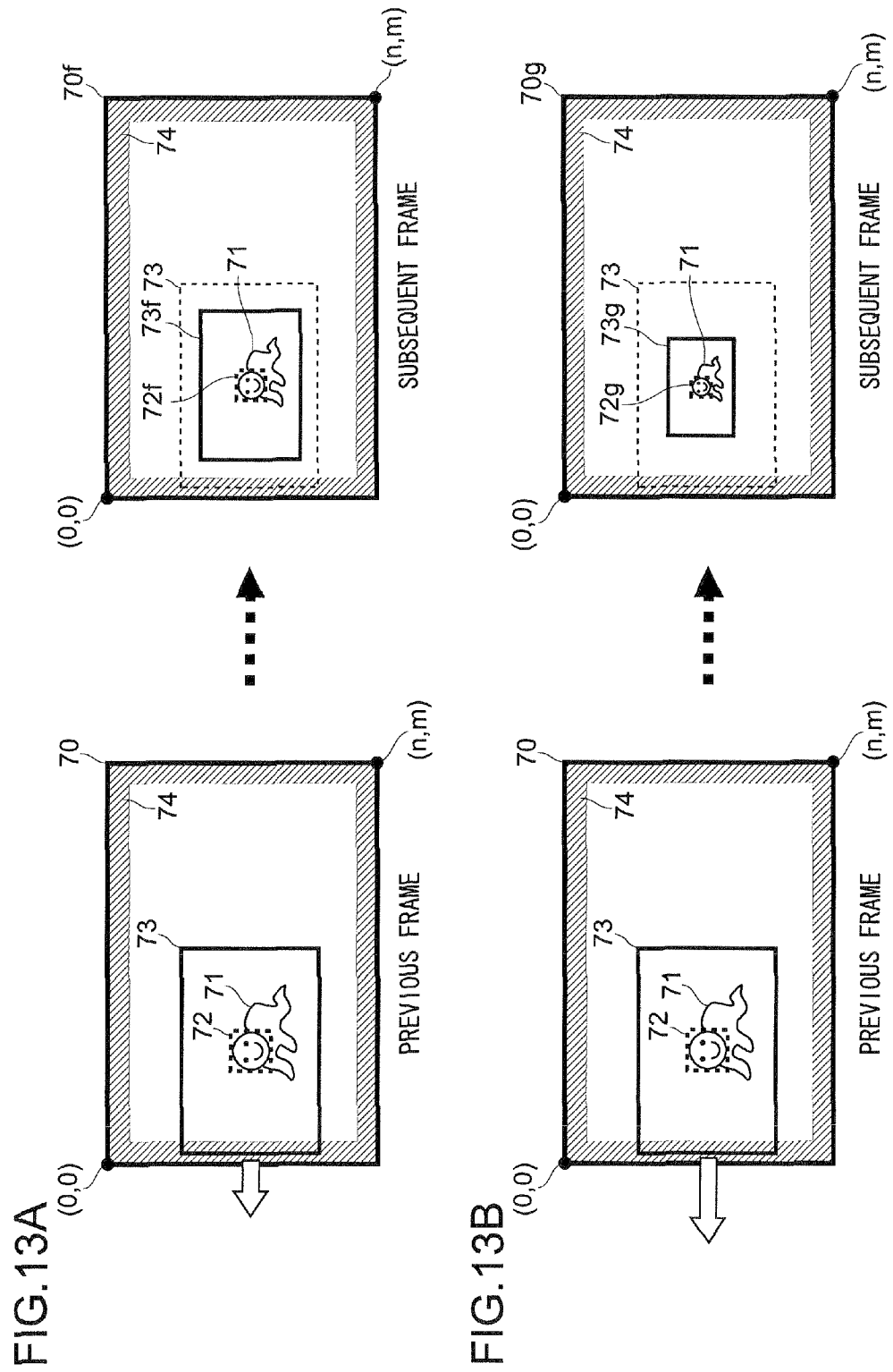

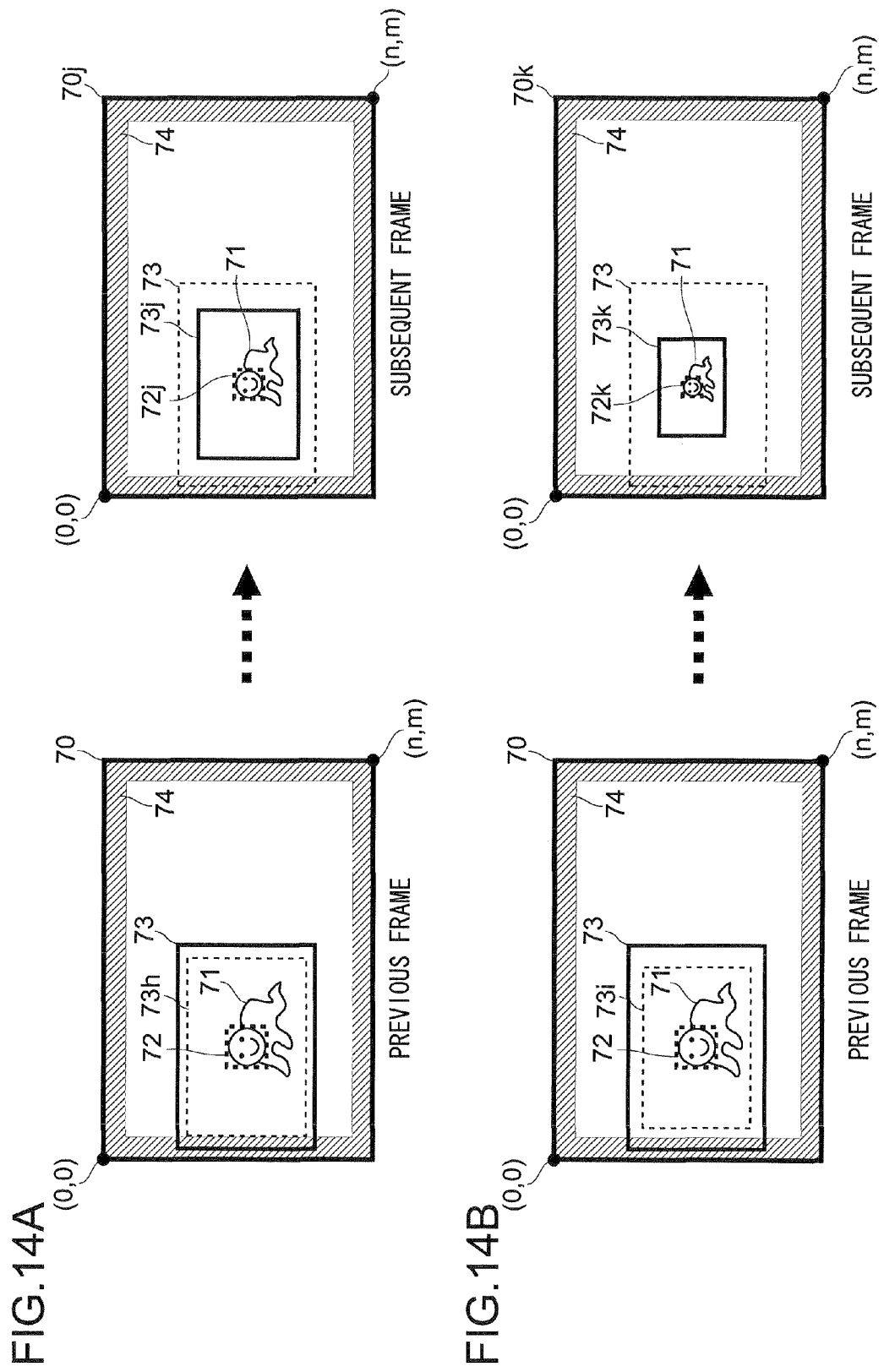

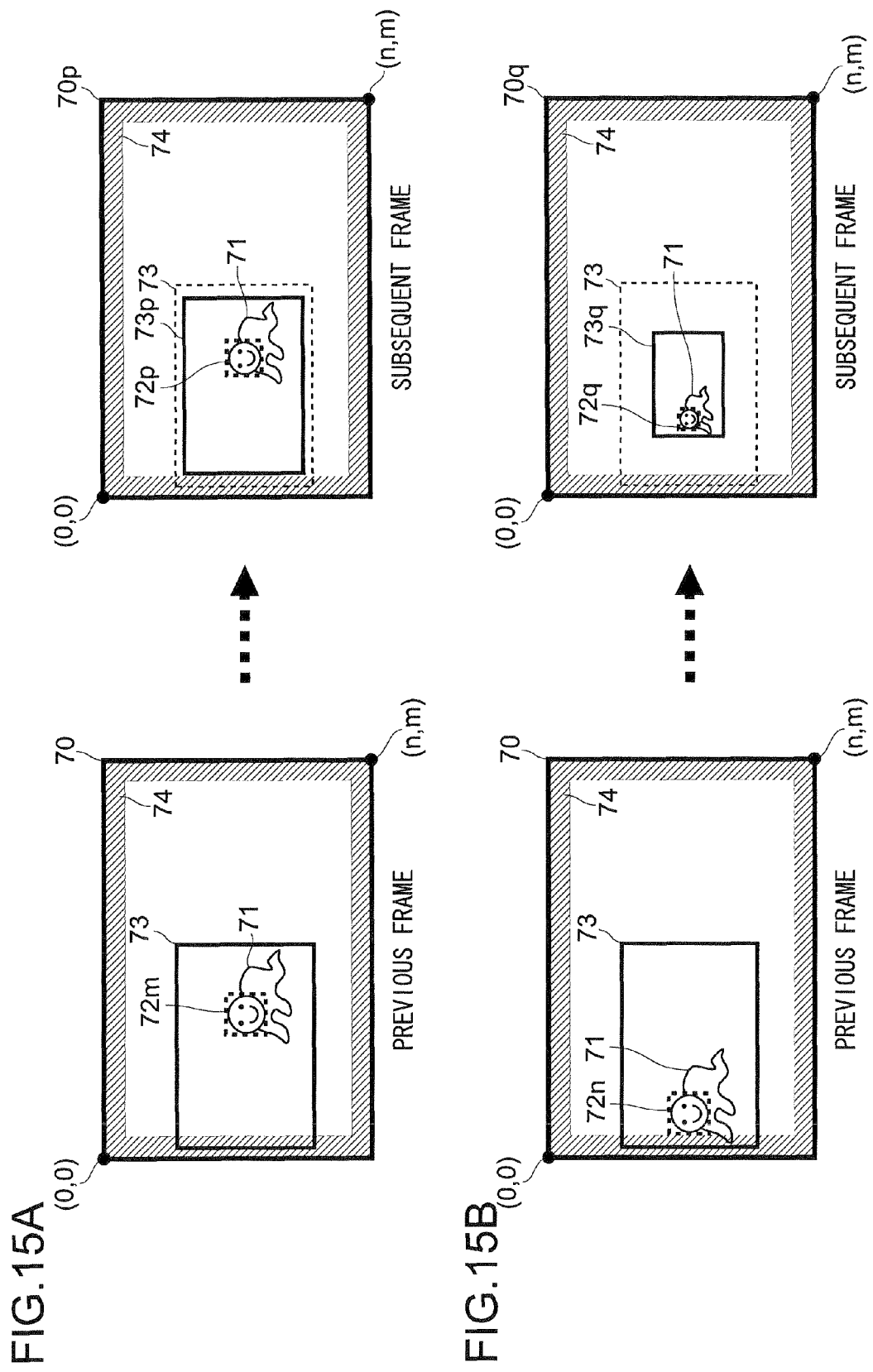

IMAGE SENSING APPARATUS

This application is based on Japanese Patent Application No. 2008-324384 filed on Dec. 19, 2008, the contents of which are hereby incorporated by reference.

BACKGROUND OF THE INVENTION

1. Field of the Invention

The present invention relates to an image sensing apparatus that clips a portion of an image obtained by image sensing to produce a clipped image.

2. Description of Related Art

In recent years, image sensing apparatuses, such as a digital still camera and a digital video camera, that sense an image with an image sensor such as a CCD (charge coupled device) or a CMOS (complementary metal oxide semiconductor) sensor have been widely used. Among such image sensing apparatuses are ones that clip a predetermined region of an image obtained by image sensing to obtain an image having a desired composition.

Such clipping processing helps facilitate image sensing. Specifically, in such clipping processing, for example, a user is allowed to shoot an image of a wide angle of view, and the clipping processing is performed on the obtained image of a wide angle of view such that a region is clipped including a subject (hereinafter, "main subject") that the user especially wishes to shoot. Such processing eliminates the need for the user to concentrate on following the main subject to obtain an image of a composition including the main subject. That is, the user has only to simply point the image sensing apparatus at the main subject.

Inconveniently, however, if the main subject is, or is almost, out of the image of a wide angle of view, it is difficult to obtain an image having a desired composition, no matter what clipping processing may be performed. This problem is liable to arise, for example, in zooming in on a main subject, or in shooting a main subject that is actively moving around.

Note that the problem of a blurred image arises if extreme zoom-out is performed to prevent the main subject from going out of, or from almost going out of, the image of a wide angle of view. In particular, since correction of zoom-out (such as image enlargement by interpolation processing, etc. after clipping) in image processing is limited in effect, a clipped image is blurred to no small extent.

SUMMARY OF THE INVENTION

According to the present invention, an image sensing apparatus is provided with an image sensing portion which obtains an input image by image sensing, a clipping processing portion which sets a clip region in said input image obtained by the image sensing portion and clips said clip region from the input image to produce a clipped image, and a control portion which controls optical zoom magnification when the image sensing portion performs image sensing. Here, the control portion controls the optical zoom magnification based on at least either a location or a size of said clip region which is set in said input image.

BRIEF DESCRIPTION OF THE DRAWINGS

FIG. 13A shows schematic diagrams of input images for illustrating a first modified example of the method of controlling the optical zoom magnification and the clip region (in a case in which the clip region does not move much).

FIG. 13B shows schematic diagrams of input images for illustrating the first modified example of the method of controlling the optical zoom magnification and the clip region (in a case in which the clip region moves much).

FIG. 14A shows schematic diagrams of input images for illustrating a second modified example of the method of controlling the optical zoom magnification and the clip region (in a case in which the size of the clip region does not change much).

FIG. 14B shows schematic diagrams of input images for illustrating the second modified example of the method of controlling the optical zoom magnification and the clip region (in a case in which the size of the clip region changes much).

FIG. 15A shows schematic diagrams of input images for illustrating a third modified example of the method of controlling the optical zoom magnification and the clip region (in a case in which a main subject is located in the clip region opposite to a side of an edge that has reached a peripheral region).

FIG. 15B shows schematic diagrams of input images for illustrating the third modified example of the method of controlling the optical zoom magnification and the clip region (in a case in which a main subject is located in the clip region on a side of an edge that has reached the peripheral region).

DETAILED DESCRIPTION OF PREFERRED EMBODIMENTS

A description will be given below of an embodiment of the present invention with reference to the accompanying drawings. First, a description will be given of an image sensing apparatus according an embodiment of the present invention. The image sensing apparatus described below is one such as a digital camera that is capable of recording both moving and still images.

<<Image Sensing Apparatus>>

Figure 1:
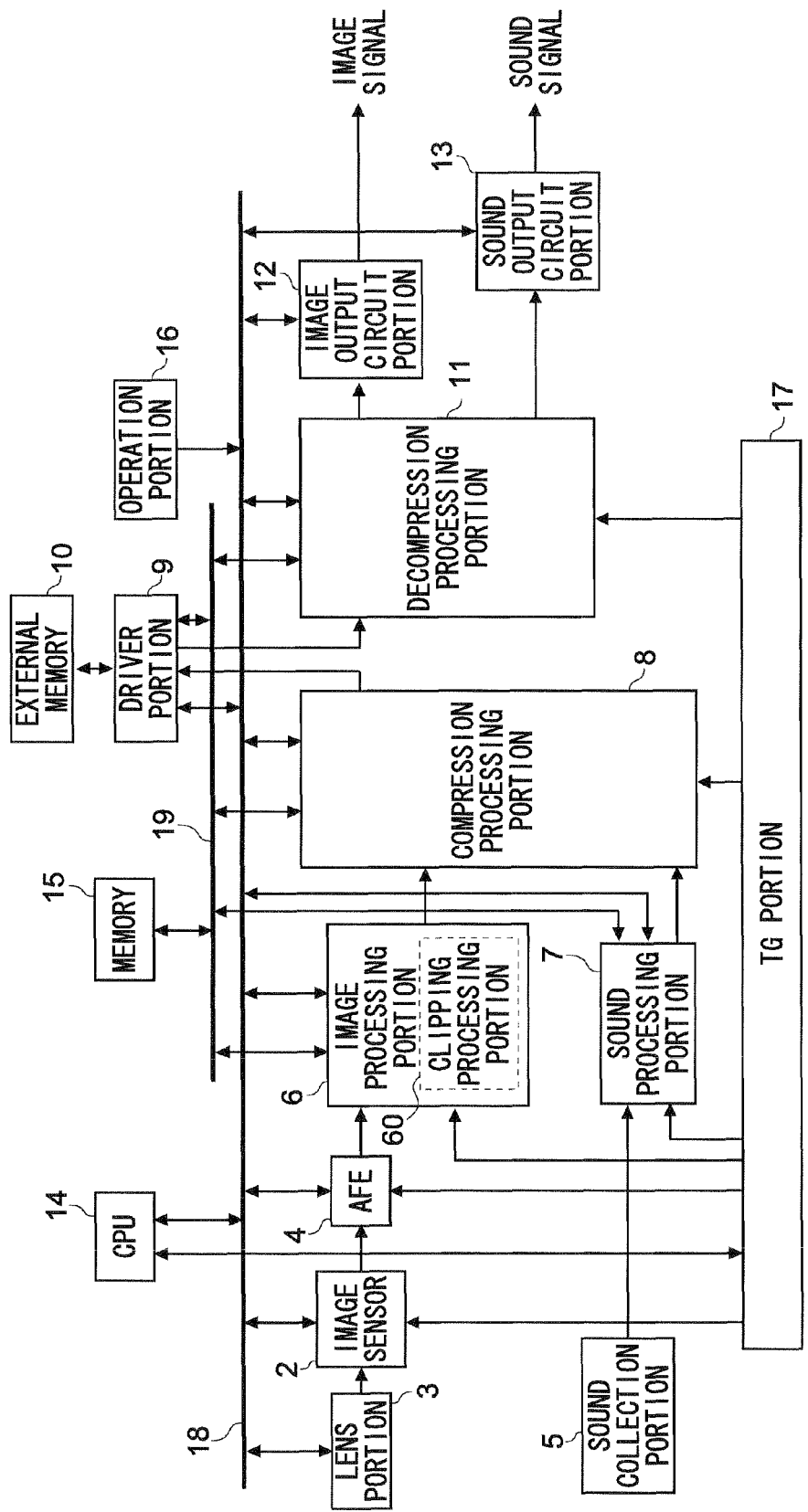
FIG. 1 is a block diagram showing the structure of an image sensing apparatus according to an embodiment of the present invention.

First, the structure of the image sensing apparatus will be described with reference to FIG. 1. FIG. 1 is a block diagram showing the structure of the image sensing apparatus according to the first embodiment of the present invention.

As shown in FIG. 1, the image sensing apparatus 1 is provided with: an image sensor 2 that is formed with a solid-state image sensing element, such as a CCD or CMOS sensor, which converts an incoming optical image into an electrical signal; and a lens portion 3 that forms an optical image of a subject on the image sensor 2 and that adjusts the amount of light, etc. The lens portion 3 and the image sensor 2 together constitute an image sensing portion, and the image sensing portion generates an image signal.

Figure 2A:
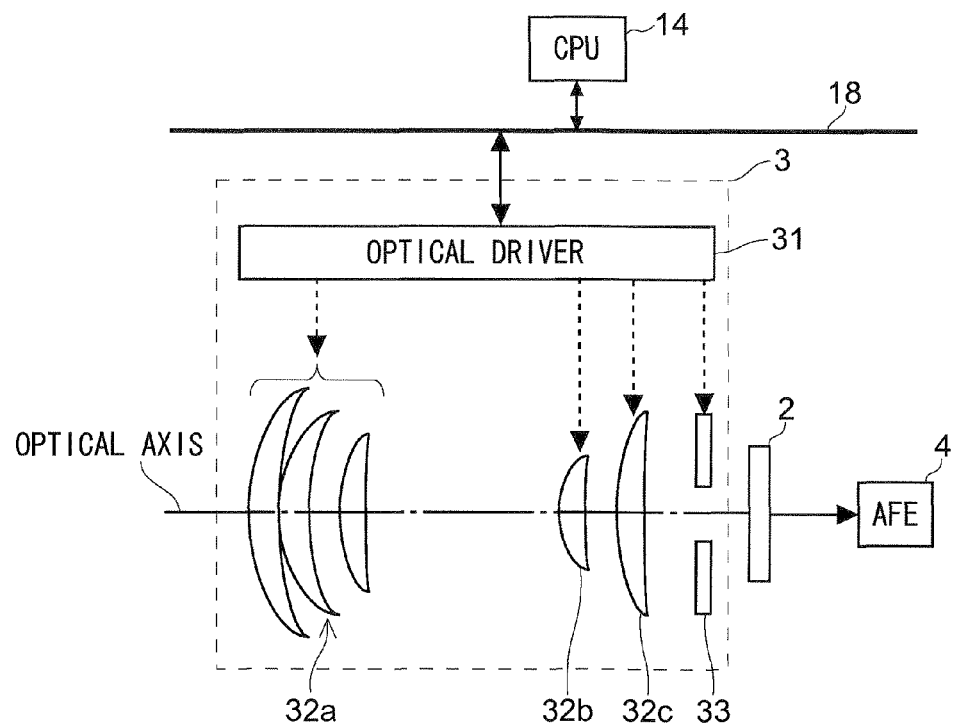
FIG. 2A is a schematic diagram showing the outline structure of a lens portion (in a state where the angle of view is the widest).
Figure 2B:
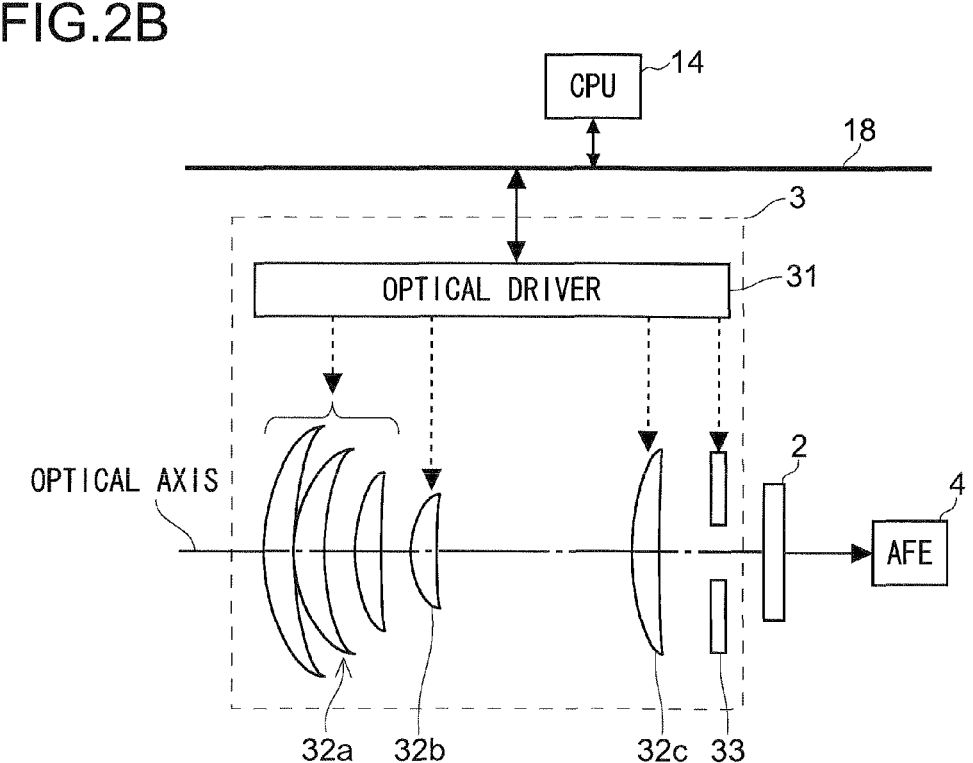
FIG. 2B is a schematic diagram showing the outline structure of a lens portion (in the most telephoto state).

FIGS. 2A and 2B are schematic diagrams showing the outline structure of the lens portion 3. As shown in FIGS. 2A and 2B, the lens portion 3 is provided with: various types of lenses such as a focus lens 32a, a variable power lens 32b, and an auxiliary lens 32c; an aperture stop 33 which adjusts the amount of light inputted to the image sensor 2; and an optical driver 31 which controls positions of lenses such as the focus lens 32a and the variable power lens 32b on an optical axis, and which controls the opening degree of the aperture stop 33.

FIG. 2A shows the lens portion 3 in the state in which the angle of view is the widest (that is, a state in which the maximum zoom-out is achieved), and FIG. 2B shows the lens portion 3 in the most telephoto state (that is, a state in which the maximum zoom-in is achieved). As shown in FIGS. 2A and 2B, mainly the variable power lens 32b moves along the optical axis to change the optical zoom magnification.

The image sensing apparatus 1 is further provided with: an AFE (analog front end) 4 which converts an image signal in the form of an analog signal outputted from the image sensor 2 into a digital signal and adjusts gain; a sound collection portion 5 which converts sound inputted thereto into an electrical signal; an image processing portion 6 which converts an image signal in the form of an R (red) G (green) B (blue) digital signal outputted from the AFE 4 into a signal using Y (brightness signal), U (color difference signal), and V (color difference signal), and which performs various types of image processing on the image signal; a sound processing portion 7 which converts a sound signal in the form of an analog signal outputted from the sound collection portion 5 into a digital signal; a compression processing portion 8 which performs compression-encoding processing for a still image, such as by a JPEG (Joint Photographic Experts Group) compression method, on the image signal outputted from the image processing portion 6, or which performs compression-encoding processing for a moving image, such as by an MPEG (Moving Picture Experts Group) compression method, on the image signal outputted from the image processing portion 6 and the sound signal outputted from the sound processing portion 7; an external memory 10 which records a compressed-encoded signal resulting from the compression-encoding by the compression processing portion 8; a driver portion 9 which records and reads the compressed-encoded signal in and from the external memory 10; and a decompression processing portion 11 which decompresses and decodes the compressed-encoded signal which is read from the external memory 10 by the driver portion 9. The image processing portion 6 is provided with a clipping processing portion 60 that clips a portion from the image signal inputted thereto to obtain a new image signal.

The image sensing apparatus 1 is further provided with: an image output circuit portion 12 which converts an image signal resulting from the decoding by the decompression processing portion 11 into a signal in a form that can be displayed on a display device (not shown) such as a display; and a sound output circuit portion 13 which converts a sound signal resulting from the decoding by the decompression processing portion 11 into a signal in a form that can be played back on a playback device (not shown) such as a speaker.

The image sensing apparatus 1 is further provided with: a CPU 14 which controls the overall operation within the image sensing apparatus 1; a memory 15 which stores programs for performing various types of processing and temporarily stores signals during the execution of the programs; an operation portion 16 via which a user inputs an instruction, the operation portion 16 including a button for starting image sensing, a button for inputting various settings, and the like; a timing generator (TG) portion 17 which outputs a timing control signal for synchronizing the operations of individual portions; a bus 18 through which signals are exchanged between the CPU 14 and the individual portions; and a bus 19 through which the individual portions exchange signals with the memory 15.

The external memory 10 may be of any type as long as it can record image signals and sound signals. For example, a semiconductor memory such as an SD (secure digital) card, an optical disc such as a DVD, or a magnetic disk such as a hard disk can be used as the external memory 10. The external memory 10 may be removable from the image sensing apparatus 1.

Next, basic operation of the image sensing apparatus 1 will be described with reference to FIG. 1. In the image sensing apparatus 1, the image sensor 2 photoelectrically converts light incoming through the lens portion 3 to acquire an image signal in the form of an electrical signal. Then, in synchronism with the timing control signal inputted from the TG portion 17, the image sensor 2 sequentially outputs the image signal to the AFE 4 at a predetermined frame period (for example, $1/30$ seconds). The image signal is converted from an analog signal to a digital signal by the AFE 4, and is then fed to the image processing portion 6. The image processing portion 6 converts the image signal into a signal using YUV, and performs various types of image processing such as gradation correction and edge enhancement. The memory 15 functions as a frame memory and temporarily holds the image signal when the image processing portion 6 performs processing.

Based on the image signal thus inputted to the image processing portion 6, the CPU 14 performs adjustments including adjustment of positions of the focus lens 32a and/or the variable power lens 32b of the lens portion 3 on the optical axis for the purpose of adjusting the focus and/or the zoom, and adjustment of the opening degree of the aperture stop 33 for the purpose of adjusting the exposure. The focus, zoom, and exposure are each adjusted to an appropriate state either automatically based on a predetermined program or manually based on the user's instruction. The clipping processing portion 60 provided in the image processing portion 6 performs clipping processing to clip a portion from the image signal fed thereto to generate a new image signal.

When a moving image is recorded, not only an image signal but also a sound signal is recorded. The sound signal converted into an electrical signal by the sound collection portion 5 to be outputted therefrom is inputted to the sound processing portion 7, where the sound signal is digitized and is subjected to processing such as noise elimination. The image signal outputted from the image processing portion 6 and the sound signal outputted from the sound processing portion 7 are both inputted to the compression processing portion 8, where the signals are compressed by a predetermined compression method. Here, the image signal and the sound signal are associated with each other in time such that the sound and the image are synchronously played back. The compressed image and sound signals are recorded in the external memory 10 via the driver portion 9.

On the other hand, when a still image or only sound is recorded, the image signal or the sound signal is compressed at the compression processing portion 8 by using a predetermined compression method to be recorded in the external memory 10. The processing performed by the image processing portion 6 when a moving image is recorded may be different from the processing performed by the image processing portion 6 when a still image is recorded.

The compressed image and sound signals recorded in the external memory 10 are read by the decompression processing portion 11 based on an instruction from the user. The decompression processing portion 11 decompresses the compressed image and sound signals, and then feeds the image signal to the image output circuit portion 12 and the sound signal to the sound output circuit portion 13. The image output circuit portion 12 and the sound output circuit portion 13 convert these signals into signals in forms that can be displayed and played back on the display device and the speaker, respectively, and outputs these signals.

The display device and the speaker may be formed integral with the image sensing apparatus 1, or may instead be formed separate from the image sensing apparatus 1, and each connected with a cable or the like to a terminal provided in the image sensing apparatus 1.

In a so-called preview mode in which recording of the image signal is not performed and an image is displayed on a display device or the like for the user to check, the image signal outputted from the image processing portion 6 may be fed to the image output circuit portion 12 without being compressed. When an image signal of a moving image is recorded, the image signal is compressed by the compression processing portion 8 and recorded in the external memory 10, and, simultaneously, the image signal may also be fed via the image output circuit portion 12 to the display device or the like.

<<Clipping Processing Portion>>
<Basic Structure>

Figure 3:
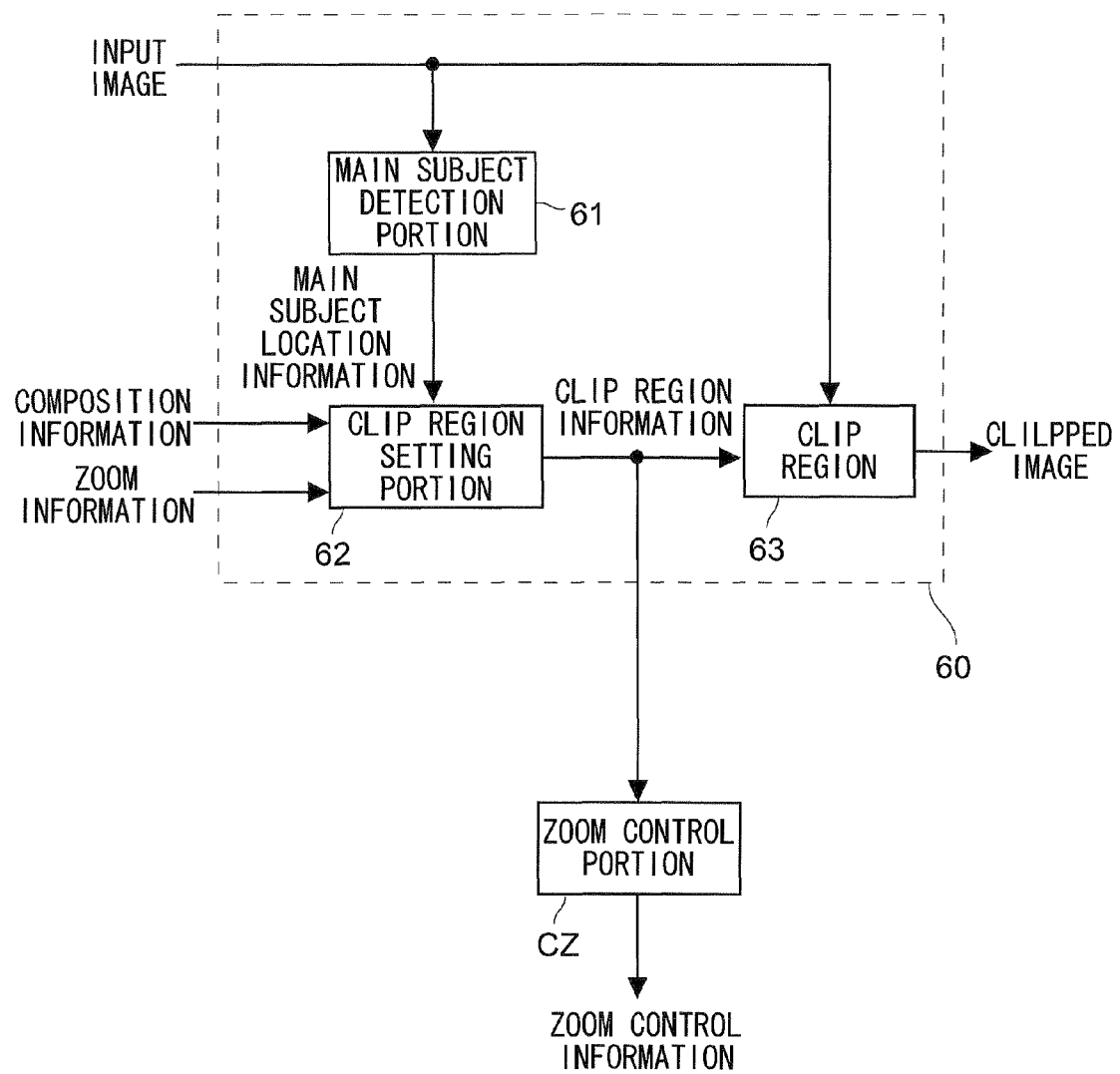
FIG. 3 is a block diagram showing the basic structure of a clipping processing portion provided in an image sensing apparatus according to an embodiment of the present invention.

Next, the basic structure of the clipping processing portion 60 shown in FIG. 1 will be described with reference to the relevant drawing. FIG. 3 is a block diagram showing the basic structure of a clipping processing portion provided in an image sensing apparatus according to an embodiment of the present invention. For a concrete description, the image signal that is inputted to the clipping processing portion 60 and subjected to clipping processing is expressed as an image and is referred to as "input image" in the following description. On the other hand, the image signal outputted from the clipping processing portion 60 is referred to as a "clipped image."

The clipping processing portion 60 is provided with: a main subject detection portion 61 which detects a main subject in an input image and outputs the main subject location information indicating the location of the main subject in the input image; a clip region setting portion 62 which sets a clip region based on the main subject location information, composition information, and zoom information, and outputs clip region information; and a clipping portion 63 which, based on the clip region information inputted thereto, clips a clip region from an input image to produce a clipped image.

The image sensing apparatus 1 is further provided with a zoom control portion CZ which outputs zoom control information which is information for controlling the zoom magnification of the lens portion 3 based on the clip region information inputted thereto. The zoom control portion CZ can be regarded as part of a control portion such as the CPU 14.

The composition information is information which indicates which region including the location of a detected main subject should be set as the clip region. The composition information may be, for example, inputted by the user at the time of initial setting before image sensing is started, or may be set in advance. Or, the composition information may be information indicating that the clip region is to be automatically set based on, for example, the orientation of the face of the main subject, the direction in which the main subject is moving, the size of the main subject, and the like.

The zoom information indicates the optical zoom magnification of the lens portion 3. For example, the zoom information may be obtained from, for example, the CPU 14 which controls the lens portion 3. The clip region information indicates the location of the clip region set in the input image. The clip region information may indicate the location of the clip region by using, for example, coordinates in the input image. The clip region information may further be provided with information indicating the location of the main subject, information indicating the composition, and the like.

The zoom control information, for example, may be information indicating that the optical zoom magnification should be higher or lower, or may be information which specifically names the value of the optical zoom magnification. The zoom control information as described above may be outputted only when the zoom control portion CZ judges that the optical zoom magnification needs to be changed, or the zoom control information (for example, information indicating that the optical zoom magnification does not need to be changed) may also be outputted when the zoom control portion CZ judges that the optical zoom magnification does not need to be changed.

Figure 4:
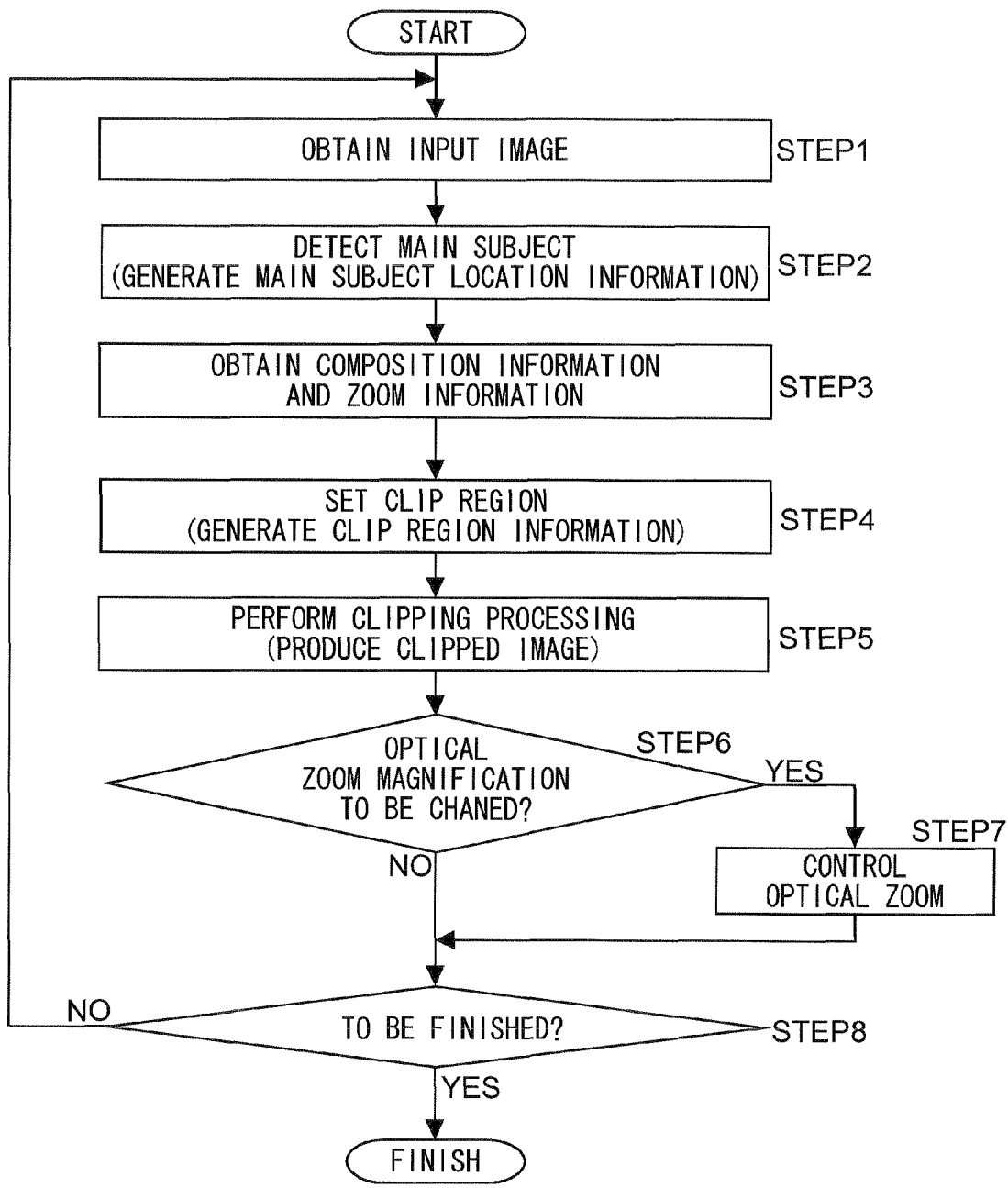
FIG. 4 is a flow chart showing the basic operation of a clipping processing portion provided in an image sensing apparatus according to an embodiment of the present invention.

The basic operation of the clipping processing portion 60 will be described with reference to the relevant drawing. FIG. 4 is a flow chart showing the basic operation of a clipping processing portion provided in an image sensing apparatus according to an embodiment of the present invention. As shown in FIG. 4, the clipping processing portion 60 first obtains an input image with respect to which clipping is to be performed (STEP 1).

Next, a main subject detection portion 61 detects the main subject from the input image obtained in STEP 1 (STEP 2). Then, the main subject location information is generated and outputted. A detailed description of how the main subject detection portion 61 detects the main subject will be given later.

The clip region setting portion 62 obtains composition information and zoom information (STEP 3). The clip region setting portion 62 also obtains the main subject location information generated in STEP 2. Then, based on these pieces of information, the clip region setting portion 62 sets the clip region to generate the clip region information (STEP 4). A detailed description will be given later of how the clip region setting portion 62 sets the clip region.

Then, the clipping portion 63 clips, from the input image obtained in STEP 1, the clip region indicated by the clip region information generated in STEP 4, to produce a clipped image (STEP 5).

The zoom control portion CZ judges, based on the clip region information, whether or not the optical zoom magnification should be changed (STEP 6). When the zoom control portion CZ judges that the optical zoom magnification should be changed (STEP 6, YES), the zoom control portion CZ feeds the CPU 14 with zoom control information indicating that the optical zoom magnification of the lens portion 3 is to be changed, and the CPU 14 changes the optical zoom magnification (STEP 7). On the other hand, when the zoom control portion CZ judges that the optical zoom magnification should not be changed (STEP 6, NO), the optical zoom magnification is not changed and the process proceeds to the next step.

Here, whether or not an instruction to finish the clipping processing has been inputted or not is checked (STEP 8). If the instruction to finish the clipping processing has not been inputted (STEP 8, NO), the process returns to STEP 1, where an input image of the next frame is obtained. Then, the operations of above described steps STEP 2 to STEP 7 are performed to produce the clipped image of the next frame. On the other hand, if the instruction to finish the clipping processing has been inputted (STEP 8, YES), the process is finished.

When the optical zoom magnification is changed in STEP 7, the angle of view of the input image is also changed accordingly. This may force the clip region setting portion 62 to maintain the composition by setting the clip region in a different way in the operation it performs with respect to the next frame (or frames thereafter) in STEP 4. Detailed descriptions will be given later of how the optical zoom magnification is controlled and how the clip region is set.

This structure makes it possible to clip an image of a desired composition including a detected main subject from an input image to produce a clipped image. Moreover, this structure makes it possible to change the optical zoom magnification when an input image is not suitable for the clipping processing (for example, when the angle of view of an input image is not wide enough to perform the clipping processing on the input image as intended) or when there is a high possibility of an input image becoming unsuitable later. In this way, the input image can be made suitable for the clipping processing. As a result, a clipped image having a desired composition can be easily obtained.

<Main Subject Detection Portion>

Next, the detection method employed by the main subject detection portion 61 will be described in detail by giving a specific example and referring to the relevant drawings. In particular, the description will be given by taking up, as an example, a detection method in which the location of a main subject in an input image is detected by detecting the face of a main subject.

Figure 5:
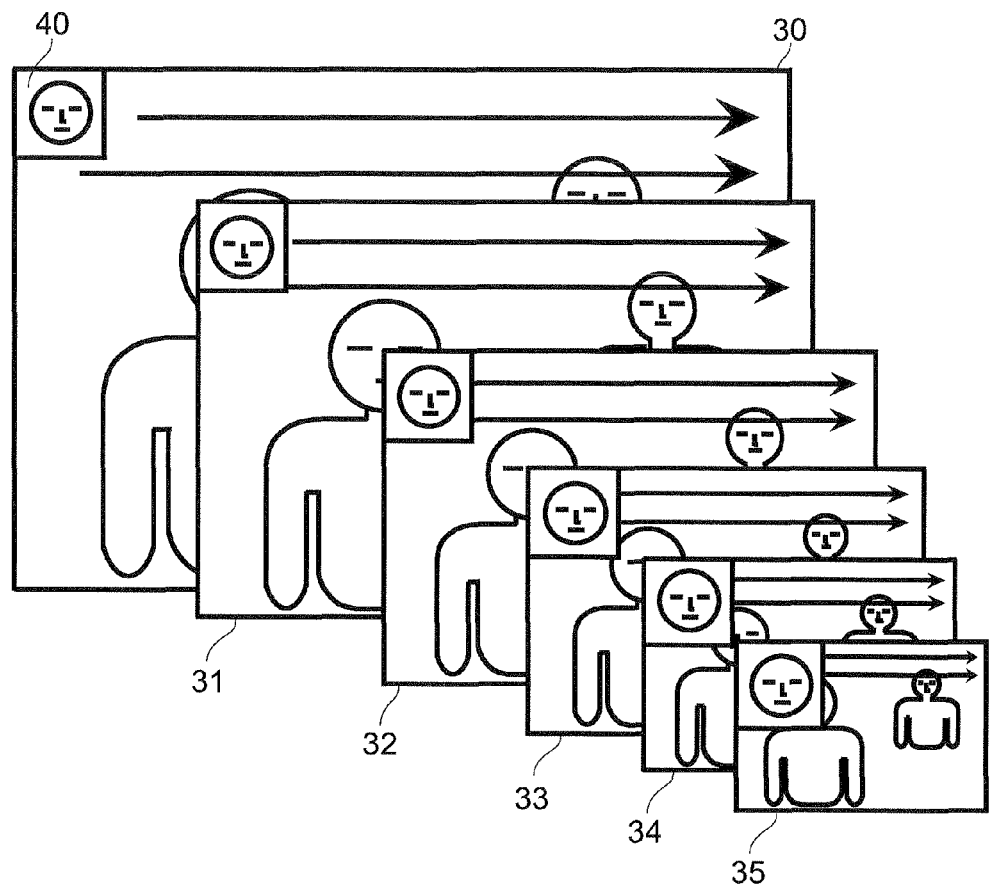
FIG. 5 is a diagram for illustrating an example of how a main subject detection portion detects a main subject.

An example of the method of face-detection processing performed by the main subject detection portion 61 will be described with the relevant drawing. FIG. 5 is a drawing for illustrating an example of the detection method used by the main subject detection portion 61, specifically an example of a face detection method. The method shown in FIG. 5 is merely an example, and any known method of face detection may be adopted.

In this example, a face is detected by comparing an input image and a weight table. The weight table is obtained from a large number of teacher samples (face and non-face sample images). Such a weight table can be produced using a known learning method called Adaboost (Yoav Freund and Robert E. Schapire, "A decision theoretic generalization of on-line learning and an application to boosting," European Conference on Computational Leaning Theory, Sep. 20, 1995). The Adaboost is one of adaptive boosting learning methods. In the Adaboost, a plurality of weak classifiers which are effective for classification are selected from a plurality of weak classifier candidates based on a large amount of teacher samples, and a high-accuracy classifier is realized by weighting and integrating the weak classifiers. As used herein, the weak classifier means a classifier that is capable of performing classification that is more accurate than simply accidental classification, but that is not so accurate as to satisfy the accuracy requirement. In selecting the weak classifiers, when an already-selected weak classifier exists, the learning is focused on a teacher sample which is wrongly recognized by the already-selected weak classifier, and thereby a weak classifier having the highest effect is selected from the remaining weak classifier candidates.

First, as shown in FIG. 5, hierarchically reduced images 31 to 35 are produced from an input image 30 by a reduction factor of, for example, 0.8. The images 30 to 35 each include a judgment region 40 for judgment, and all the judgment regions 40 are equal in size. As indicated by arrows in the figure, the judgment regions 40 are moved from left to right on the images, and thereby horizontal scanning is performed. The horizontal scanning is performed from top to bottom of the images to scan the entire images. In the horizontal scanning, matching is performed for detecting a face image that matches the judgment region 40. Here, since the plurality of reduced images 31 to 35 are produced in addition to the input image 30, faces of different sizes can be detected by using only one type of weight table. Note that the scanning order is not limited to the above-described order, and that the scanning may be performed in any order.

The matching includes a plurality of judgment steps performed in the increasing order of fineness of judgment. When no face is detected in a judgment step, the process does not proceed to the next judgment step, and it is judged that there exists no face in the judgment region 40. Only when a face is detected in all the judgment steps, it is judged that there exists a face in the judgment region 40, and the process proceeds to judgment with the next judgment region 40. The above example is for detecting a frontal face, but the orientation of the face of a main subject and the like may be detected by using, for example, a profile face sample.

A face region that includes a face of a main subject can be detected from an input image by performing face detection processing by using the above described method or the like. And, for example, the main subject detection portion 61 outputs the information of the location of the detected face region in an input image as the main subject location information.

The orientation of the face of the main subject may be detected to be included in the main subject location information. In the detection method described above, the orientation of the face of the main subject may be detected, for example, by using a profile face sample. Moreover, the face of a specific person may be recorded with which to perform face recognition processing to detect the specific person. Moreover, a plurality of detected face regions may be outputted as the main subject location information.

Figure 6:
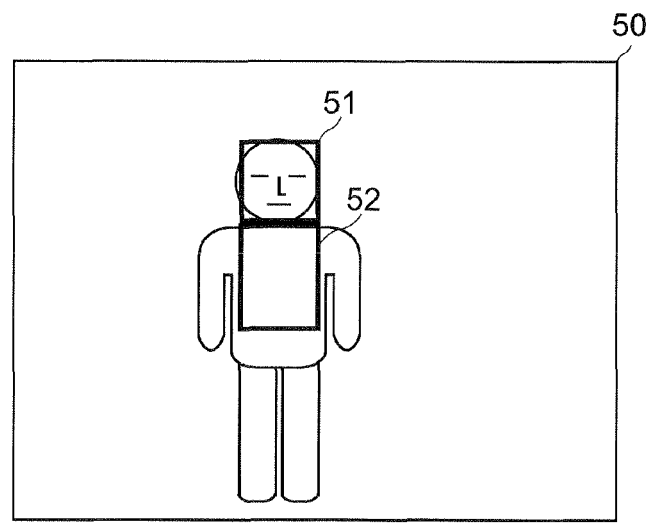
FIG. 6 is a diagram showing an example of tracking processing.

Moreover, tracking processing may be used to detect the location of the main subject. An example of this case is shown in FIG. 6. FIG. 6 is a diagram showing an example of the tracking processing. In the method shown in FIG. 6, a face region 51 of the main subject is first detected from an input image 50 by the face detection processing. Then, a torso region 52 including the torso of the main subject is set to be located adjoined to and below (in the direction from between the eyebrows to the mouth) the face region 51. Then, the torso region 52 is detected with respect to each sequentially inputted input image 50, to thereby perform the tracking processing of the main subject. Here, the tracking processing is performed based on the color of the torso region 52 (for example, a signal value indicating color, such as color difference signals U and V, RGB signals, a signal H among H (Hue), S (Saturation), and B (Brightness) signals, and the like). To be specific, for example, the color of the torso region 52 is recognized and stored when the torso region is set, and the tracking processing is performed by detecting, from an image inputted thereafter, a region having a color similar to the recognized color.

Note that the above described method of detecting a main subject is merely an example, and, in the image sensing apparatus according to this embodiment, a main subject may be detected by using any method.

<Clip Region Setting Portion>

Next, a detailed description will be given of a specific example of how the clip region setting portion 62 sets the clip region, with reference to the relevant drawing. For a concrete description, the following description discusses a case in which the main subject location information outputted by the main subject detection portion 61 is information that indicates the face region of the main subject.

The clip region setting portion 62 sets the clip region based on composition information that is inputted and set, for example, by the user via the operation portion 16. The composition information is set, for example, according to the composition determined by the user during the display of a preview image performed before image recording is started.

Figure 7:
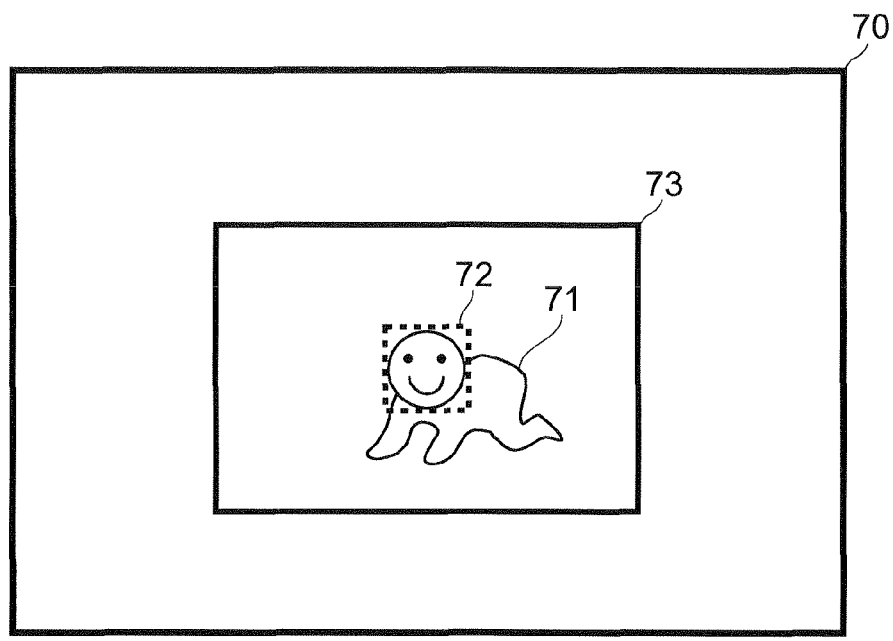
FIG. 7 is a schematic diagram of an input image showing an example of how a clip region is set.

A schematic diagram of an input image is shown in FIG. 7 for illustrating an example of the setting of the clip region. The example shown in FIG. 7 deals with a case in which a region of a predetermined size around a face region 72 of a main subject 71 is set as a clip region 73. The composition information may include information of the size of the set clip region 73. For example, the composition information may include information indicating that the size of the clip region 73 is larger than the face region 72 by a predetermined factor.

The clip region setting portion 62 grasps the value of the optical zoom magnification on the lens portion 3 from zoom information fed thereto. When the optical zoom magnification is changed, the clip region setting portion 62 changes the size of the clip region so as to maintain the composition set according to the composition information.

The main subject location region may include not only the information of the location of the main subject, but also, for example, information of the orientation of the main subject (for example, the orientation of the face or the body). The clip region setting portion 62 may use the orientation of the main subject to set the clip region. For example, the clip region may be set such that there is a wider space on the side of the direction in which the main subject faces than on the opposite side.

Moreover, the main subject location information may include information indicating the movement of the main subject. In that case, the main subject detection portion 61 detects a movement vector of the main subject by using a variety of matching methods such as the block matching method and the representative point matching method, and calculates the direction in which the main subject moves. And, the clip region setting portion 62 may set the clip region by using the direction in which the main subject moves. For example, the clip region may be set such that there is a wider space on the side toward which the main subject moves than on the opposite side.

<Clipping Portion>

The clipping portion 63 clips from an input image a clip region indicated by clip region information. Here, the clipping portion 63 may perform enlargement processing (for example, interpolation processing on pixels) or reduction processing (for example, thinning-out processing of pixels or summation-averaging processing of pixels) on the clipped image, to output an image of a predetermined size as a clipped image.

<<Control Method of Optical Zoom Magnification and Clip Region>>

Next, descriptions will be given of control methods of the optical zoom magnification and the clip region of an image sensing apparatus embodying the present invention. Specific embodiments will be discussed and each embodiment will be described referring to relevant drawings in the following descriptions. Specifically, descriptions will be given of the control method of the optical zoom magnification by the zoom control portion CZ and the CPU 14, and of the clip region setting method performed by the clip region setting portion 62 according to the control result of the optical zoom magnification.

First Example

Figure 8A:
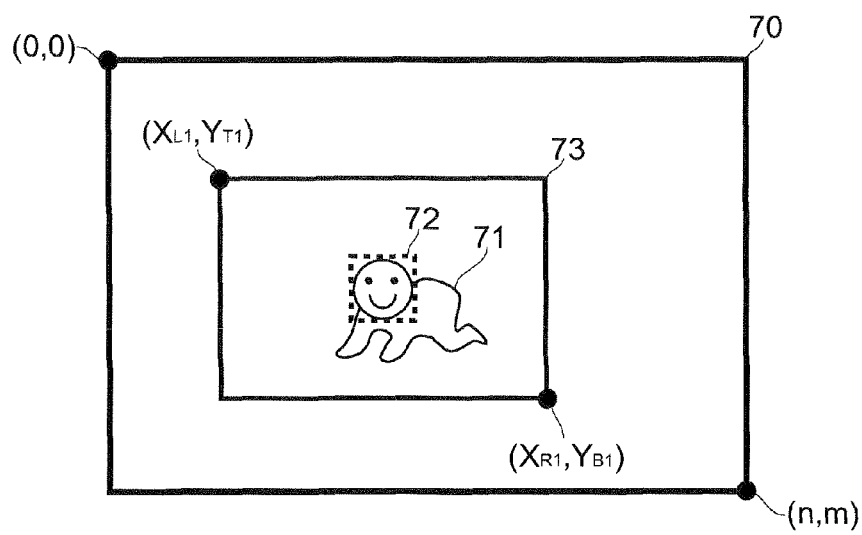
FIG. 8A is a schematic diagram of an input image (oldest) for illustrating a first example of a method of controlling optical zoom magnification and a clip region.
Figure 8B:
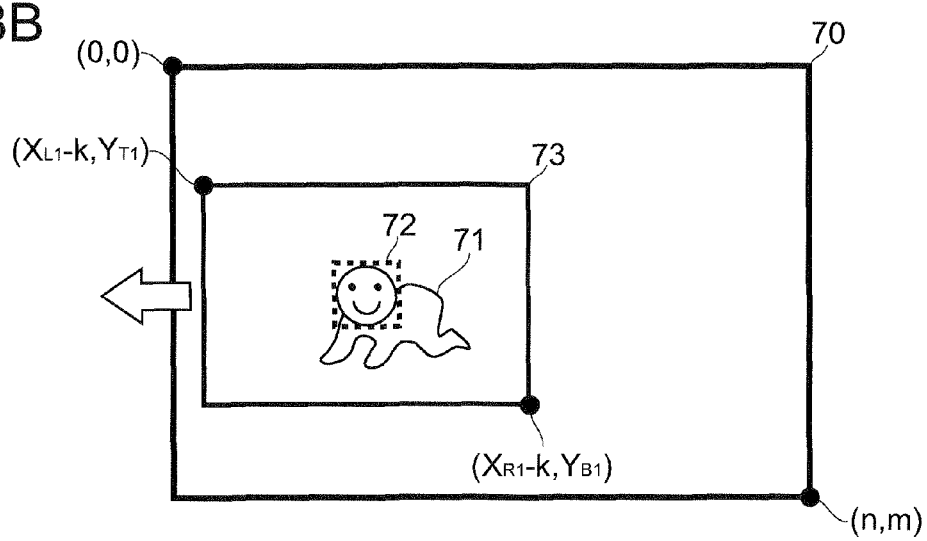
FIG. 8B is a schematic diagram of an input image (intermediate) for illustrating the first example of the method of controlling the optical zoom magnification and the clip region.
Figure 8C:
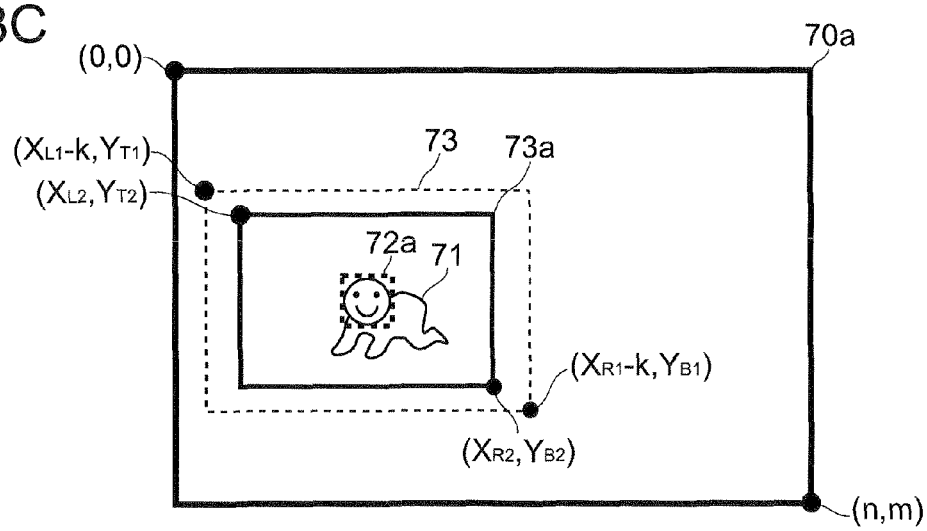
FIG. 8C is a schematic diagram of an input image (newest) for illustrating the first example of the method of controlling the optical zoom magnification and the clip region.

In this example, the zoom control portion CZ performs judgment based on the location of a clip region in an input image. A specific example is shown in FIGS. 8A to 8C. FIGS. 8A to 8C are schematic diagrams of input images for illustrating the first example of the control method of the optical zoom magnification and the clip region. The input images 70 and 70a shown in FIGS. 8A to 8C are similar to the input image 70 shown in FIG. 7. Among FIGS. 8A to 8C, FIG. 8A shows the oldest frame, and FIG. 8C shown the newest frame. In the following descriptions, the location of the clip region will be indicated by the coordinates (X, Y) in the input image. Here, the value of X increases toward the right side in the figure, and the value of Y increases downward in the figure. The top left and bottom right coordinates in the input image are (0, 0) and (n, m), respectively.

FIG. 8A shows a case in which the top left and bottom right coordinates of a clip region 73 are $(X_{L1}, Y_{T1})$ and $(X_{R1}, Y_{B1})$, respectively. In FIG. 8B, since the main subject 71 has moved leftward, the top left and bottom right coordinates of the clip region 73 are $(X_{L1}-k, Y_{T1})$ and $(X_{R1}-k, Y_{B1})$, respectively (k; positive number).

Here, in FIG. 8B, the leftward direction is the direction in which the clip region 73 moves (the direction in which the main subject 71 moves), and the left edge $(X_{L1}-k)$ of the clip region 73 is located in the vicinity of the left edge (0) of the input image 70 (for example, the difference value $(X_{L1}-k)$ between the two left edges is smaller than a predetermined value). That is, the clip region 73 is located in the vicinity of an edge portion of the input image and is moving toward the outside of the edge portion. In such a case, the clip region 73 is likely to be set protruding out of the input image 70, or the main subject 71 is likely to move to the outside of the input image 70.

The zoom control portion CZ, on finding the state as shown in FIG. 8B to have been achieved, outputs zoom control information for reducing the optical zoom magnification (that is, for widening the angle of view of the input image 70). The CPU 14 controls the lens portion 3 based on the zoom control information to reduce the optical zoom magnification.

When the optical zoom magnification is reduced, the angle of view becomes wider as in the input image 70a shown in FIG. 8C. At this time, the top left and bottom right coordinates of the clip region are $(X_{L2}, Y_{T2})$ and $(X_{R2}, Y_{B2})$, respectively, where, in particular, the relationship "$X_{L2} > X_{L1}-k$" is satisfied.

As a result, the location of the main subject 71 in the input image 70a is closer to the center. This prevents the clip region 73a and the main subject 71 from protruding out of the input image 70a, making it easy to obtain a clipped image having a desired composition.

To give the clip region 73a the same composition as the clip region 73, as shown in FIG. 8C, the clip region 73 is made smaller in size to be set as the clip region 73a. For example, the size of the clip region 73a is set such that the following relationship is satisfied:

$$Ma/M = (X_{R2}-X_{L2})/(X_{R1}-X_{L1})$$

$$Ma/M = (Y_{B2}-Y_{T2})/(Y_{B1}-Y_{T1}),$$

where M indicates the optical zoom magnification in FIGS. 8A and 8B, and Ma indicates the optical zoom magnification in FIG. 8C.

In the specific example described above, judgment is performed with respect to the left edge of the clip region to control the optical zoom magnification, but the same judgment and control can be performed with respect to the right, upper and lower edges as well.

Also, the direction in which a clip region moves may be calculated based on a comparison result between the location of the clip region in a frame previous in time (hereinafter, previous frame) and that in a frame subsequent in time (hereinafter, subsequent frame).

Figure 9A:
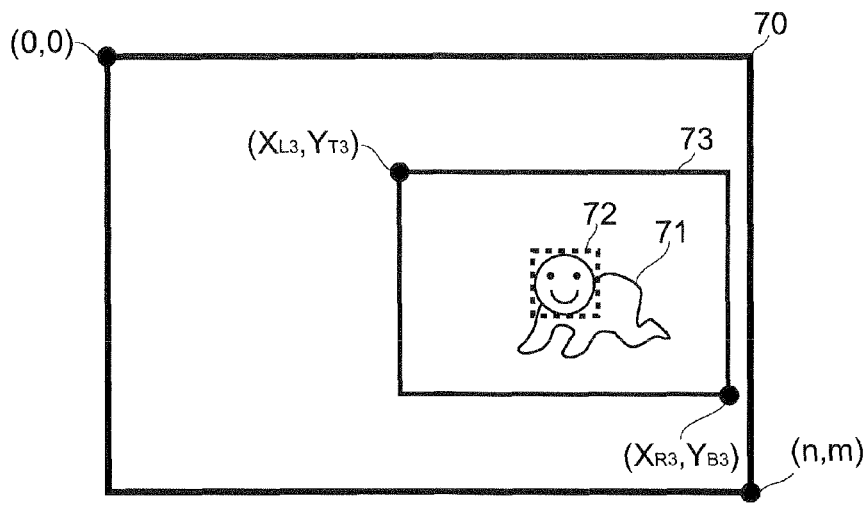
FIG. 9A is a schematic diagram of an input image (another example, oldest) for illustrating the first example of the method of controlling the optical zoom magnification and the clip region.
Figure 9B:
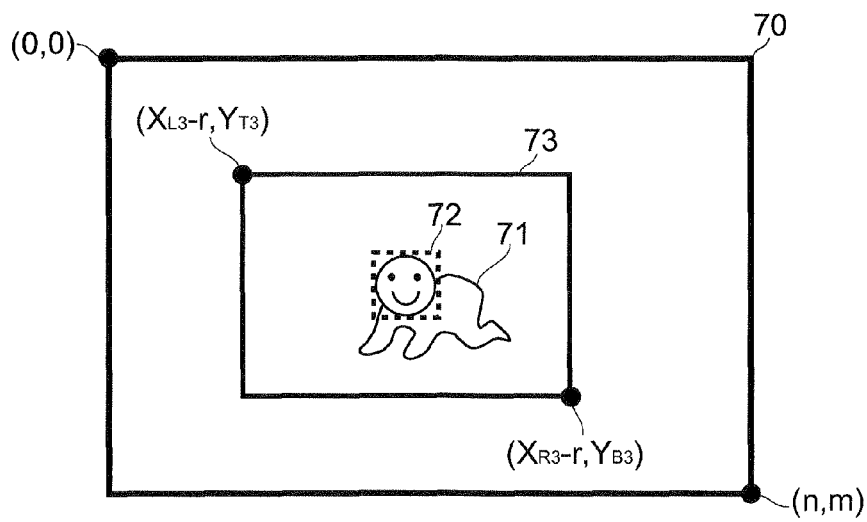
FIG. 9B is a schematic diagram of an input image (another example, intermediate) for illustrating the first example of the method of controlling the optical zoom magnification and the clip region.
Figure 9C:
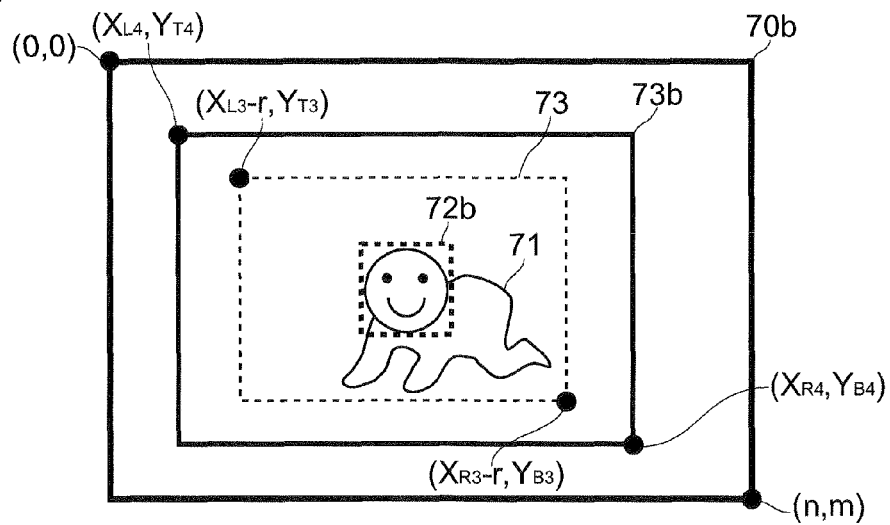
FIG. 9C is a schematic diagram of an input image (another example, newest) for illustrating the first example of the method of controlling the optical zoom magnification and the clip region.

FIGS. 9A to 9C show another specific example different from that shown in FIGS. 8A to 8C. FIGS. 9A to 9C are schematic diagrams of input images for illustrating the first example of the control method of the optical zoom magnification and the clip region, showing an example different from the example shown in FIG. 8. The same parts as those shown in FIGS. 8A to 8C will be identified by the same symbols, and detailed descriptions thereof will not be repeated. Coordinates will be described in the same manner as in FIGS. 8A to 8C.

FIG. 9A shows a case in which the top left and bottom right coordinates of the clip region 73 are $(X_{L3}, Y_{T3})$ and $(X_{R3}, Y_{B3})$, respectively. In FIG. 9B, since the main subject 71 has moved leftward, the top left and bottom right coordinates of the clip region 73 are $(X_{L3}-r, Y_{r3})$ and $(X_{R3}-r, Y_{B3})$, respectively (r; positive number).

Here, FIG. 9B shows a state in which the clip region 73 is located substantially at the center of the input image 70 (for example, a state where the distance between the center point of the clip region 73 and the center point of the input image 70 is not greater than a predetermined value in a plurality of frames). Furthermore, the ratio of the clip region 73 to the input image 70 is not greater than a predetermined value. In such a case, the clip region 73 and the main subject 71 are unlikely to protrude out of the input image 70.

The state shown in FIG. 9B can also be described as a state in which the distance between each of the four sides of the clip region 73 and a corresponding one of the four sides of the input image 70 is not smaller than a predetermined value (or a predetermined ratio). The state shown in FIG. 9B can also be described as a state in which the following conditions are simultaneously fulfilled: $Y_{T3}$ is not smaller than a predetermined value; $X_{R3}-r$ is not greater than a predetermined value; and $Y_{B3}$ is not greater than a predetermined value.

The zoom control portion CZ, on finding the state as shown in FIG. 8B to have been achieved, outputs zoom control information for increasing the optical zoom magnification (that is, for narrowing the angle of view of the input image 70). The CPU 14 controls the lens portion 3 based on the zoom control information to raise the optical zoom magnification.

When the optical zoom magnification is raised, the angle of view becomes narrower as in the input image 70b shown in FIG. 9C. As a result, the input image 70b in which the main subject 71 is larger and clearer can be obtained. And, the main subject 71 is clearer in the clipped image which is to be obtained from this input image 70b as well. Thus, it is possible to obtain a clipped image in which the main subject 71 is clear to a maximum extent.

To give the clip region 73b the same composition as the composition of the clip region 73, as shown in FIG. 9C, the clip region 73 is made larger in size to be set as the clip region 73b. For example, the size of the clip region 73b is set such that the following relationship is satisfied:

$$Mb/M = (X_{R4}-X_{L4})/(X_{R3}-X_{L3})$$

$$Mb/M = (Y_{B4}-Y_{T4})/(Y_{B3}-Y_{T3}),$$

where M indicates the optical zoom magnification in FIGS. 9A and 9B, and Mb indicates the optical zoom magnification in FIG. 9C.

Second Example

This example is similar to the first example in that the zoom control portion CZ performs judgment based on the location of a clip region in an input image. However, this example is different from the first example in that judgment is performed by using a peripheral region defined as a region extending a predetermined amount (for example, a predetermined distance or a predetermined ratio) inward from each edge of the input image.

Figure 10A:
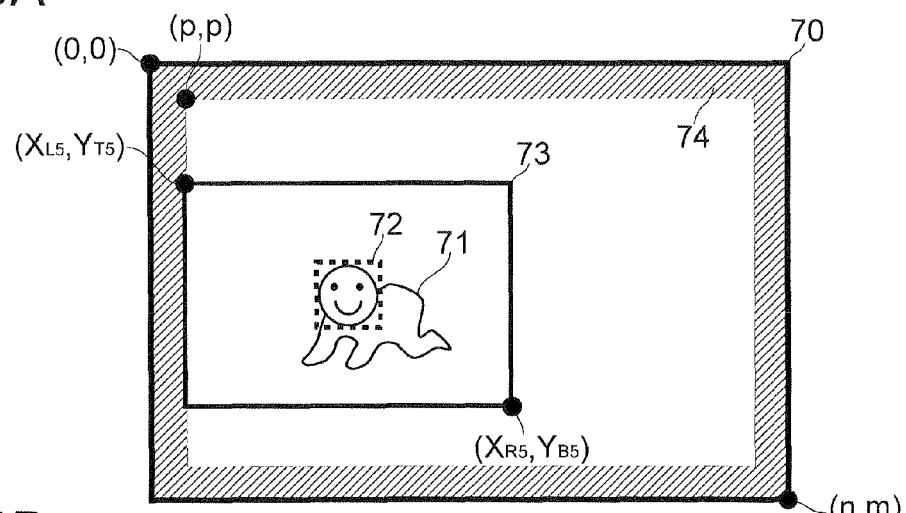
FIG. 10A is a schematic diagram of an input image (oldest) for illustrating a second example of the method of controlling the optical zoom magnification and the clip region.
Figure 10B:
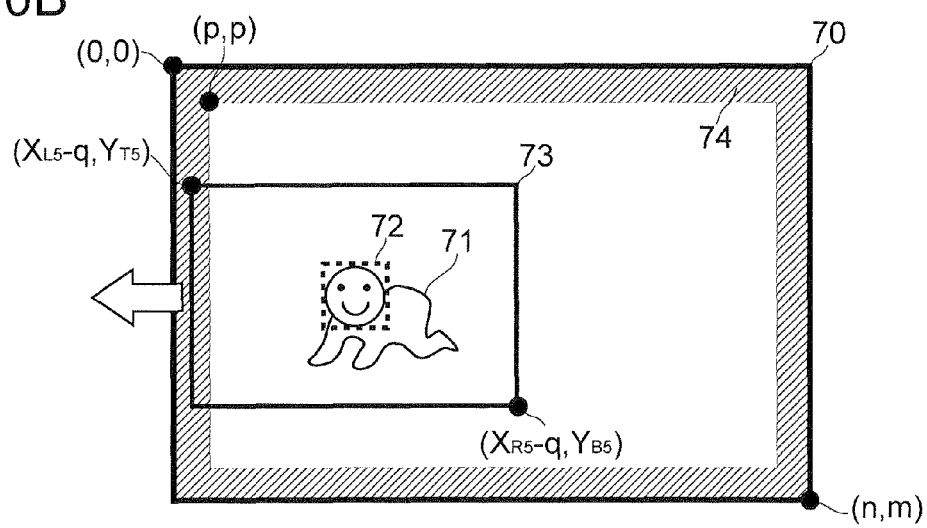
FIG. 10B is a schematic diagram of an input image (intermediate) for illustrating the second example of the method of controlling the optical zoom magnification and the clip region.
Figure 10C:
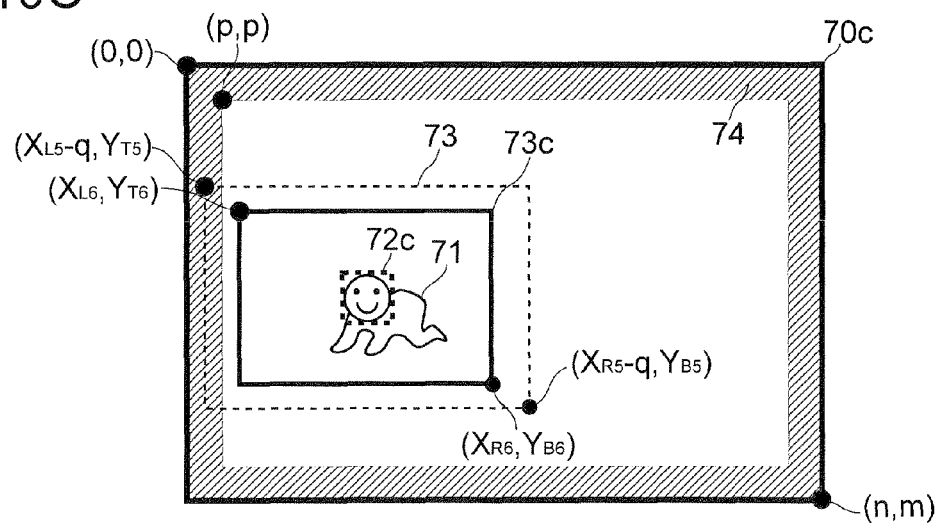
FIG. 10C is a schematic diagram of an input image (newest) for illustrating the second example of the method of controlling the optical zoom magnification and the clip region.

A specific example is shown in FIGS. 10A to 10C. FIGS. 10A to 10C are schematic diagrams of input images for illustrating the second example of the control method of the optical zoom magnification and the clip region, and correspond to FIGS. 8A to 8C, respectively, which illustrate the first example. The same parts as those shown in FIGS. 8A to 8C will be identified by the same symbols, and detailed descriptions thereof will not be repeated. Coordinates will be described in the same manner as in FIGS. 8A to 8C. The peripheral region 74 is a region in each of the input images 70 and 70c, extending a length p (p: positive number) inward from each edge. Incidentally, the length p is also referred to as the width of the peripheral region 74.

FIG. 10A shows a case in which the top left and bottom right coordinates of the clip region 73 are $(X_{L5}, Y_{T5})$ and $(X_{R5}, Y_{B5})$, respectively. The left edge of the clip region 73 has reached the peripheral region 74, that is, the relationship "$X_{L5} < p$" is satisfied. Here, it is assumed that the left edge of the clip region 73 does not reach the peripheral region 74 in any frame preceding the frame shown in FIG. 10A.

In FIG. 10B, since the main subject 71 has moved leftward, the top left and bottom right coordinates of the clip region 73 are $(X_{L5}-q, Y_{T5})$ and $(X_{R5}-q, Y_{B5})$, respectively (q; positive number). In this state, the relationship "$X_{L5}-q < X_{L5} < p$" is satisfied.

In FIG. 10B, the leftward direction is the direction in which the clip region 73 moves (the direction in which the main subject 71 moves), and the left edge ($X_{L5}-q$) of the clip region 73 is located within the peripheral region 74. That is, the clip region 73 is located in the vicinity of an edge portion of the input image and moving toward the outside of the edge portion. In such a case, the clip region 73 is likely to be set protruding to the outside of the input image 70, or the main subject 71 is likely to move to the outside of the input image 70.

The zoom control portion CZ, on finding the state as shown in FIG. 10B to have been achieved, outputs zoom control information for reducing the optical zoom magnification (that is, for widening the angle of view of the input image 70). The CPU 14 controls the lens portion 3 based on the zoom control information to lower the optical zoom magnification.

When the optical zoom magnification is reduced, the angle of view becomes wider as in the input image 70c shown in FIG. 10C. In this state, the top left and bottom right coordinates of the clip region are $(X_{L6}, Y_{T6})$ and $(X_{R6}, Y_{B6})$, respectively, where, in particular, the relationship "$X_{L6} > X_{L5}-q$" is satisfied.

As a result, the location of the main subject 71 in the input image 70c comes closer to the center to prevent the clip region 73c and the main subject 71 from protruding out of the input image 70c. This makes it easy to obtain a clipped image having a desired composition.

Furthermore, if the optical zoom magnification is reduced such that the relationship "$X_{L6} > p$" is satisfied (that is, such that no edge of the clip region 73c enters the peripheral region 74), the clip region 73c and the main subject 71 are more securely prevented from protruding to the outside of the input image 70c. Moreover, it is possible to more accurately prevent the clip region 73c and the main subject 71 from protruding to the outside of the input image 70c by appropriately adjusting the width of the peripheral region 74 as will be described later.

To give the clip region 73c the same composition as the composition of the clip region 73, as shown in FIG. 10C, the clip region 73 is made smaller in size to be set as the clip region 73c. For example, the size of the clip region 73c is set such that the following relationship is satisfied:

$$Mc/M = (X_{R6} - X_{L6})/(X_{R5} - X_{L5})$$

$$Mc/M = (Y_{B6} - Y_{T6})/(Y_{R5} - Y_{T5}),$$

where M indicates the optical zoom magnification in FIGS. 10A and 10B, and Mc indicating the optical zoom magnification in FIG. 10C.

In the specific example described above, judgment is performed with respect to the left edge of the clip region 73, but the same judgment can be performed with respect to the right, upper and lower edges as well.

Also, the direction in which the clip region 73 moves may be calculated based on a comparison result between the location of the clip region in a previous frame and that in a subsequent frame.

Also, the optical zoom magnification starts to be reduced at the time point shown in FIG. 10B (that is, when an edge side of the clip region 73, after reaching the peripheral region 74, is about to protrude out of the peripheral region 74), but the reduction of the optical zoom magnification may be started at the time point shown in FIG. 10A. That is, control of the optical zoom magnification may be performed when the clip region 73, after an edge side thereof has reached the peripheral region 74, is still moving in the edge-side direction.

Also, the same control as shown in FIGS. 9A to 9C may be performed in this example as well. That is, the optical zoom magnification may be increased if the ratio of the clip region 73 to the input image 70 is a predetermined value or smaller when the clip region 73 is located substantially at the center of the input 70. Furthermore, the condition for the increase of the optical zoom magnification may be the state in which the four sides of the clip region 73 are located predetermined distances (or rates) or more inward from the peripheral region 74.

(Example of Setting the Width of Peripheral Region)

[First Example of Setting]

Figure 11A:
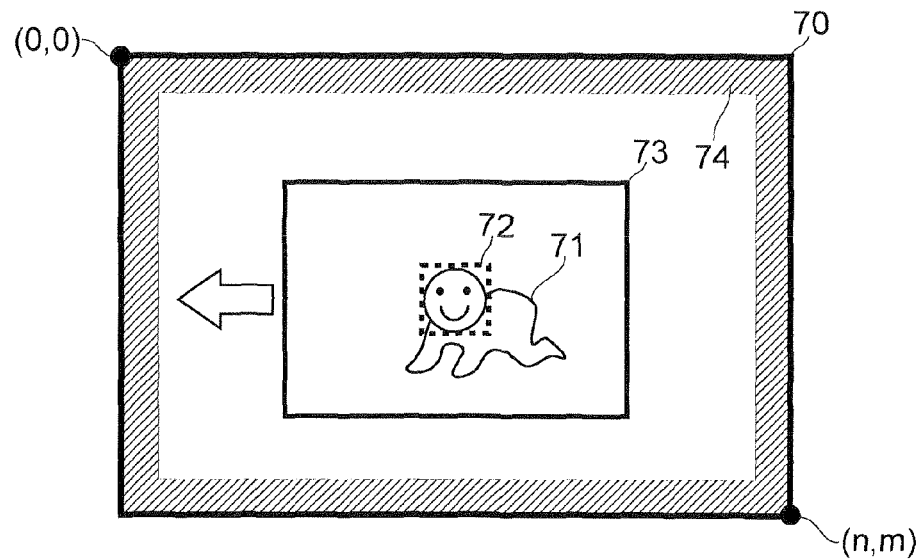
FIG. 11A is a schematic diagram of an input image for illustrating a first example of setting a peripheral region (in a case in which the clip region does not move much) in the second example of the method of controlling the optical zoom magnification and the clip region.
Figure 11B:
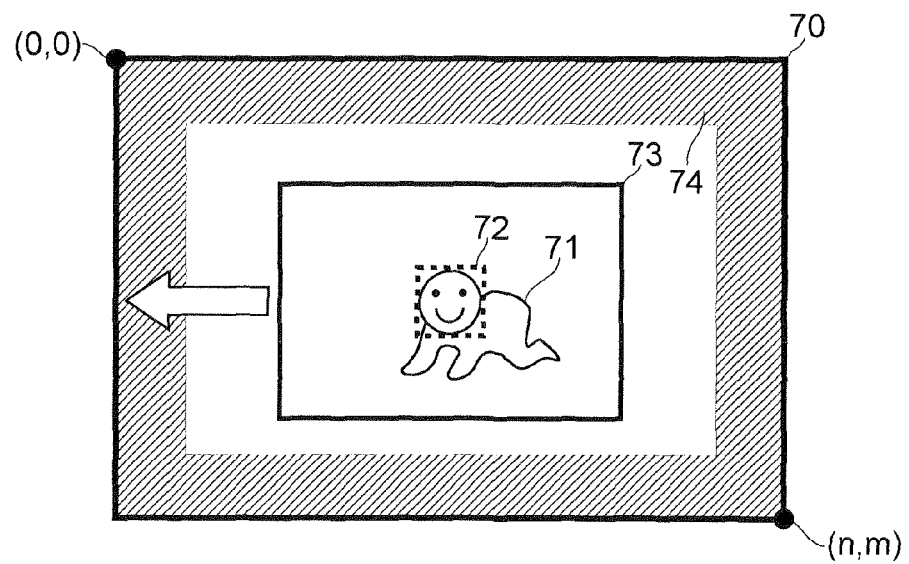
FIG. 11B is a schematic diagram of an input image for illustrating the first example of setting the peripheral region (in a case in which the clip region moves much) in the second example of the method of controlling the optical zoom magnification and the clip region.

Next, a description will be given of an example of setting the width of the peripheral region in the second example of the method of controlling the optical zoom magnification and the clip region. FIGS. 11A and 11B are schematic diagrams of input images showing the first example of setting the peripheral region in the second example of the method of controlling the optical zoom magnification and the clip region. The same parts as those shown in FIGS. 10A to 10C will be identified by the same symbols, and detailed descriptions thereof will not be repeated. Coordinates will be described in the same manner as in FIGS. 10A to 10C.

As shown in FIGS. 11A and 11B, in this example of setting, the width of the peripheral region 74 is set according to an amount of movement of the clip region 73. In particular, the width of the peripheral region 74 is set narrow when the amount of movement (indicated by the length of the outline arrow in the figure) is small as shown in FIG. 11A, while the width is set wide when the amount of movement is large as shown in FIG. 11B.

With this structure, when the clip region 73 moves so much that the possibility of its protruding out of the input image 70 is likely to increase, the width of the peripheral region 74 is set wide and the optical zoom magnification is reduced at an early stage. This makes it possible to accurately prevent the clip region 73 and the main subject 71 from protruding out of the input image 70, and thus to easily obtain a clipped image having a desired composition.

When the clip region 73 does not move so much and thus the possibility of its protruding out of the input image 70 is less likely to increase, the width of the peripheral region 74 is set narrow and, if possible, the optical zoom magnification is not reduced. This helps prevent the clipped image from being blurred due to unnecessarily reduced optical zoom magnification.

As shown in the formula (1) below, the amount of movement PD may be calculated by using a method in which central coordinates of clip regions in previous and subsequent frames are compared. In the formula (1) below, the top left, right bottom, and central coordinates of the clip region in the previous frame are $(X_{Lb}, Y_{Tb})$, $(X_{Rb}, Y_{Bb})$, and $(X_b, Y_b)$, respectively. The top left, right bottom, and central coordinates of the clip region in the subsequent frame are $(X_{La}, Y_{Ta})$, $(X_{Ra}, Y_{Ba})$, and $(X_a, Y_a)$, respectively.

$$X_b = \frac{(X_{Lb} + X_{Rb})}{2}, Y_b = \frac{(Y_{Tb} + Y_{Bb})}{2} \qquad (1)$$
$$X_a = \frac{(X_{La} + X_{Ra})}{2}, Y_a = \frac{(Y_{Ta} + Y_{Ba})}{2}$$
$$PD = \sqrt{(X_a - X_b)^2 + (Y_a - Y_b)^2}$$

This definition of the amount of movement PD makes it possible to correctly calculate the amount of movement PD even when the size of a clip region is greatly changed (including, for example a case in which the size of a clip region is set according to the size of a main subject in an input image, and a case in which the size of a clip region is changed along with the zoom optical magnification).

[Second Example of Setting]

Figure 12A:
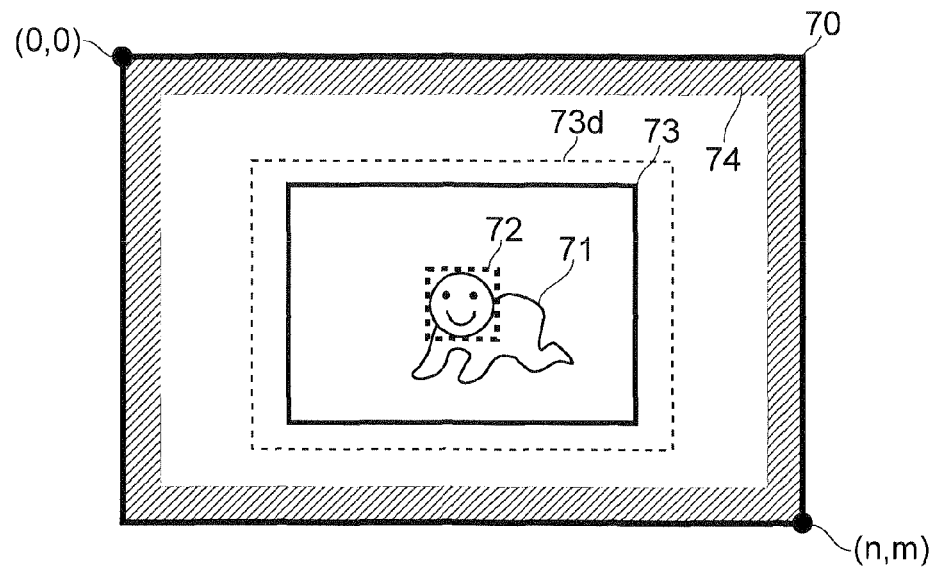
FIG. 12A is a schematic diagram of an input image showing a second example of setting the peripheral region (in a case in which the size of the clip region does not change much) in the second example of the method of controlling the optical zoom magnification and the clip region.
Figure 12B:
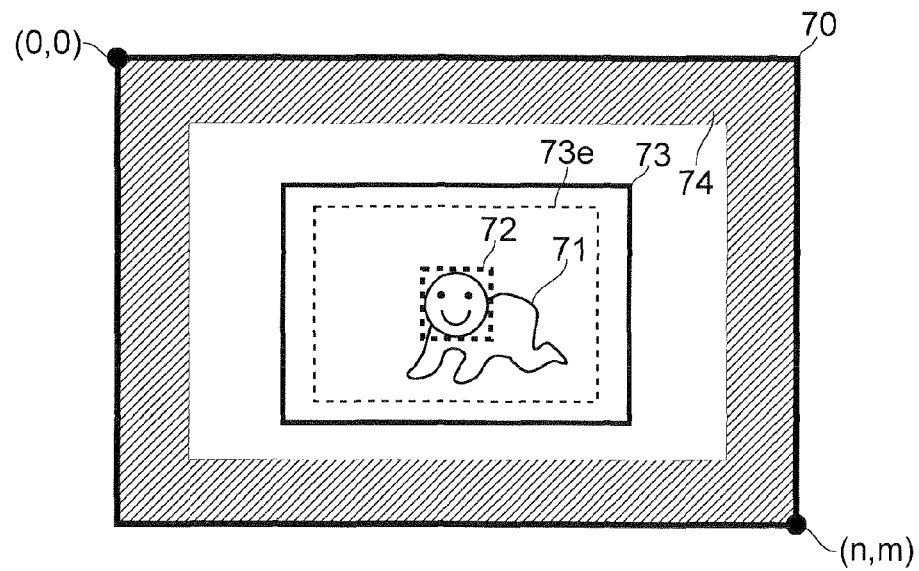
FIG. 12B is a schematic diagram of an input image showing the second example of setting the peripheral region (in a case in which the size of the clip region changes much) in the second example of the method of controlling the optical zoom magnification and the clip region.

A description will be given of a second example of setting the width of the peripheral region with reference to relevant drawings. FIGS. 12A and 12B are each a schematic diagram of an input image showing the second example of setting the peripheral region in the second example of the method of controlling the optical zoom magnification and the clip region. FIGS. 12A and 12B correspond to FIGS. 11A and 11B, respectively, which show the first example of setting the width of the peripheral region. The same parts as those shown in FIGS. 11A and 11B will be identified by the same symbols, and detailed descriptions thereof will not be repeated. Coordinates will be described in the same manner as it, FIGS. 11A and 11B.

This example of setting can be preferably applied, for example, to a case in which the size of a clip region is set according to the size of a main subject. In this case, the size of the clip region changes as the main subject moves in a depth direction. For example, the clip region becomes bigger as the main subject approaches the image sensing apparatus, while the clip region becomes smaller as the main subject moves away from the image sensing apparatus.

This example of setting can also be preferably applied to a case in which the size of the clip region is changed to maintain a composition when the zoom magnification is changed through operation by a user or the like. In this case, for example, the clip region becomes larger when the zoom magnification is increased, while the clip region becomes smaller when the zoom magnification is reduced.

As shown in FIG. 12, in this example of setting, the width of the peripheral region 74 is set according to an amount of change in size of the clip region 73. In particular, when the amount of change in size of the clip region 73 is small as shown in FIG. 12A, the width of the peripheral region 74 is set narrow, while the width is set wide when the amount of change in size of the clip region 73 is large as shown in FIG. 12B. The clip region 73 in the frame shown in FIG. 12A is smaller than the clip region 73d in the previous frame. That is, the amount of change in size of the clip region is small (for example, a negative value in the form of difference value, and smaller than 1 in the form of ratio). On the other hand, the clip region 73 in the frame shown in FIG. 12B is smaller than the clip region 73e in the previous frame. That is, the amount of change in size of the clip region is large (for example, a positive value in the form of difference value, and larger than 1 in the form of ratio).

With this structure, when the clip region 73 and the main subject 71 in the input image 70 become larger so quickly that the possibility of their protruding out of the input image 70 is likely to increase, the width of the peripheral region 74 is set wide and the optical zoom magnification is reduced at an early stage. This makes it possible to accurately prevent the clip region 73 and the main subject 71 from protruding out of the input image 70, and thus to easily obtain a clipped image having a desired composition.

With this structure, when the clip region 73 and the main subject 71 in the input image 70 do not become larger quickly and thus the possibility of their protruding out of the input image 70 is less likely to increase, the width of the peripheral region 74 is set narrow and the optical zoom magnification is not reduced if possible. As a result, the clipped image can be prevented from being blurred due to unnecessarily reduced optical zoom magnification.

As shown in the formula (2) below, the amount of change in size of the clip region AD may be calculated by using a difference value between areas of clip regions in previous and subsequent frames. In the formula (2) below, top left and right bottom coordinates of the clip region in the previous frame are $(X_{Lb}, Y_{Tb})$ and $(X_{Rb}, Y_{Bb})$, respectively. Top left and right bottom coordinates of the clip region in the subsequent frame are $(X_{La}, Y_{Ta})$ and $(X_{Ra}, Y_{Ba})$, respectively.

$$A_b = (X_{Rb} - X_{Lb}) \times (Y_{Bb} - Y_{Tb})$$
$$A_a = (X_{Ra} - X_{La}) \times (Y_{Ba} - Y_{Ta})$$
$$AD = A_a - A_b \qquad (2)$$

According to the above formula (2), the amount of change AD in size of a clip region is calculated by using the area of the clip region, but a value such as the length of a diagonal line of the clip region or a sum of lengths of the four sides of the clip region may be used instead.

The first and second examples of setting can be practiced in combination. In such a case, the width of the peripheral region may be set based on, for example, a value obtained by combining values resulting from weighted addition of the amount of movement of the clip region and the amount of change in size of the clip region.

MODIFIED EXAMPLE

A description will be given of modified examples of the first and second examples described above, with reference to the relevant drawings. The modified examples are particularly related to how the value of the optical zoom magnification is set when the zoom control portion CZ finds it necessary to reduce the optical zoom magnification. The modified examples can be applied to both the first and second examples described above, but here, for simplicity of description, merely a case in which the modified examples are applied to the second example will be discussed. Furthermore, a description will be given of a case in which the size of a clip region is changed with the optical zoom magnification for the purpose of maintaining the composition of a clipped image before and after the change of the optical zoom magnification.

First Modified Example

FIGS. 13A and 13B are schematic diagrams of input images for illustrating a first modified example of the method of controlling the optical zoom magnification and the clip region. FIGS. 13A and 13B are similar to FIGS. 10A to 10C which illustrate the second example. The same parts as those shown in FIGS. 10A to 10C will be identified by the same symbols, and detailed descriptions thereof will not be repeated. Coordinates will be described in the same manner as in FIGS. 11A and 11B.

According to this modified example, the amount of change in optical zoom magnification is adjusted based on the amount of movement of the clip region. FIG. 13A illustrates the optical zoom magnification set when the amount of movement is small, while FIG. 13B illustrates the optical zoom magnification set when the amount of movement is large. Both in FIGS. 13A and 13B, the zoom control portion CZ finds it necessary to reduce the optical zoom magnification at the time point of the previous frame, and accordingly the optical zoom magnification is reduced in the subsequent frame.

According to this modified example, the optical zoom magnification is reduced more in an input image 70$g$ in FIG. 13B where the amount of movement is larger than in an input image 70$f$ in FIG. 13A where the amount of movement is small.

With this structure, the more the clip region 73 moves, and accordingly, the higher the possibility is of the clip region 73 and the main subject 71 protruding out of the input image 70, the more the optical zoom magnification is reduced. This makes it possible to effectively prevent the clip region 73$g$ and the main subject 71 from protruding out of the input image 70$g$, and thus to easily obtain a clipped image having a desired composition.

When the amount of movement of the clip region 73 is small and accordingly the clip region 73 is less likely to protrude out of the input image 70, the optical zoom magnification is less reduced. As a result, the clipped image can be prevented from being blurred due to unnecessarily reduced optical zoom magnification.

This modified example may be applied to increasing the optical zoom magnification as shown in FIGS. 9A to 9C. For example, in the state as shown in FIG. 9B, the smaller the amount of movement of the clip region 73 is, the more the optical zoom magnification may be increased.

The amount of movement of the clip region in this modified example may be the amount of movement PD according to the above-described formula (1).

Second Modified Example

FIGS. 14A and 14B are schematic diagrams of input images for illustrating a second modified example of the method of controlling the optical zoom magnification and the clip region. FIGS. 14A and 14B correspond to FIGS. 13A and 13B which show the first modified example. The same parts as those shown in FIGS. 13A and 13B will be identified by the same symbols, and detailed descriptions thereof will not be repeated. Coordinates will be described in the same manner as in FIGS. 13A and 13B.

According to this modified example, the amount of change in optical zoom magnification is adjusted based on the amount of change in size of the clip region. FIG. 14A illustrates the optical zoom magnification set when the amount of change in size of the clip region is small, while FIG. 14B illustrates the optical zoom magnification set when the amount of change in size of the clip region is large. Both in FIGS. 14A and 14B, the zoom control portion CZ finds it necessary to reduce the optical zoom magnification at the time point of the previous frame, and accordingly the optical zoom magnification is reduced in the subsequent frame. Clip regions 73$h$ and 73$i$ are each a clip region in a frame further preceding the previous frame in time.

According to this modified example, the optical zoom magnification is reduced more in an input image 70$k$ in FIG. 14B where the amount of change in size of the clip region is large than in an input image 70$j$ in FIG. 14A where the amount of change in size of the clip region is small.

With this structure, the more the size of the clip region 73 changes, and accordingly the higher the possibility is of the clip region 73 and the main subject 71 protruding out of the input image 70, the more the optical zoom magnification is reduced. This makes it possible to effectively prevent the clip region 73$k$ and the main subject 71 from protruding out of the input image 70$k$, and thus to easily obtain a clipped image having a desired composition.

When the amount of change in size of the clip region 73 is small and accordingly the clip region 73 is less likely to protrude out of the input image 70, the optical zoom magnification is less reduced. As a result, the clipped image can be prevented from being blurred due to unnecessarily reduced optical zoom magnification.

This modified example may be applied to increasing the optical zoom magnification as shown in FIGS. 9A to 9C. For example, in the state as shown in FIG. 9B, the smaller the amount of change in size of the clip region 73 is, the more the optical zoom magnification may be increased.

The amount of change in size of the clip region in this modified example may be the amount of change AD according to the above-described formula (2).

Third Modified Example

FIGS. 15A and 15B are schematic diagrams of input images for illustrating a third modified example of the method of controlling the optical zoom magnification and the clip region. FIGS. 15A and 15B correspond to FIGS. 13A and 13B which illustrate the first modified example. The same parts as those shown in FIGS. 13A and 13B will be identified by the same symbols, and detailed descriptions thereof will not be repeated. Coordinates will be described in the same manner as in FIGS. 13A and 13B.

According to this modified example, the amount of change in optical zoom magnification is adjusted based on the composition of the clip region. FIG. 15A illustrates the optical zoom magnification set when the main subject 71 (in particular, a face region 72$m$) in the clip region 73 is located on the right side of the clip region 73, not on the left side which is the side of the edge of the clip region 73 that has reached the peripheral region 74. FIG. 15B illustrates the optical zoom magnification set when the main subject 71 (in particular, a face region 72$n$) in the clip region 73 is located on the side of the edge of the clip region 73 that has reached the peripheral region 74 (that is, the left side of the clip region 73). Both in FIGS. 14A and 14B, the zoom control portion CZ finds it necessary to reduce the optical zoom magnification at the time point of the previous frame, and accordingly the optical zoom magnification is reduced in the subsequent frame.

According to this modified example, the optical zoom magnification is reduced more in an input image 70q in FIG. 15B where the main subject 71 is located in the clip region 73 on the side of the edge that is likely to protrude out of the input image 70q than in an input image 70p in FIG. 15A where the main subject 71 is located in the clip region 73 opposite to the side of the edge that is likely to protrude out of the input image 70p.

With this structure, the more the main subject 71 is likely to protrude out of the input image 70, the main subject 71 being located on the side of the edge of the clip region 73 that is likely to protrude out of the input image, the more the optical zoom magnification is reduced. This makes it possible to effectively prevent the main subject 71 from protruding out of the input image 70, and thus to easily obtain a clipped image having a desired composition.

On the other hand, when the main subject 71 is less likely to protrude out of the input image 70, the main subject 71 being located opposite to the side of the edge of the clip region 73 that is likely to protrude out of the input image, the optical zoom magnification is less reduced. As a result, the clipped image can be prevented from being blurred due to reducing the optical zoom magnification unnecessarily and excessively.

This modified example may be applied when the optical zoom magnification is increased as shown in FIGS. 9A to 9C. For example, in the state as shown in FIG. 9B, the closer to the center of the clip region 73 or the center of the input image 70 the main subject 71 is located in the composition, the more the optical zoom magnification may be increased.

The first to third modified examples can be practiced in combination. In such a case, the optical zoom magnification may be set based on a value obtained, for example, by combining values resulting from weighted-adding an amount of movement of a clip region, an amount of change in size of the clip region, and a distance between a main subject and an edge of the clip region (or an input image) on the side at which it is likely to protrude out.

In the image sensing apparatus 1 according to an embodiment of the present invention, operations performed by portions such as the image processing portion 6 and the clipping processing portion 60 may be carried out by a control device such as a microcomputer. Furthermore, all or part of the functions realized by such a control device may be prepared in the form of a computer program so that those functions—all or part—are realized as the computer program is executed on a program execution apparatus (for example, a computer).

In addition to the above-described case, the image sensing apparatus 1 shown in FIG. 1 and the clipping processing portion 60 shown in FIG. 2 can be realized in hardware or in a combination of hardware and software. When the image sensing apparatus 1 and the clipping processing portion 60 are structured with software, block diagrams for portions that are realized by the software serve as functional block diagrams for such portions.

The above descriptions deal with an embodiment of the resent invention, but the scope of the present invention is not limited to this embodiment, and many modifications are possible without departing from the spirit of the invention.

The present invention relates to an image sensing apparatus exemplified by a digital video camera. In particular, the present invention relates to an image sensing apparatus which obtains a desired clipped image from an input image.

What is claimed is:

1. An image sensing apparatus, comprising:
an image sensing portion which obtains an input image by image sensing;
a clipping processing portion which sets a clip region in said input image obtained by the image sensing portion so that a plurality of clip regions are sequentially set as said clip region in a plurality of input images which are sequentially obtained as said input image by the image sensing portion, and which clips said clip region from the input image to produce a clipped image; and
a control portion which controls optical zoom magnification when the image sensing portion performs image sensing,
wherein
the control portion controls the optical zoom magnification based on an amount of change in size of said clip region set in said input image,
the control portion controls the optical zoom magnification further based on an amount of change in location of the clip regions that are sequentially set as said clip region in the input images obtained as said input image,
the control portion reduces the optical zoom magnification in image sensing performed by the image sensing portion on detecting that said clip region is set in a vicinity of an edge of said input image and that locations of the plurality of clip regions which are sequentially set as said clip region in the plurality of input images which are sequentially obtained as said input image by the image sensing portion approach said edge of said input image one after another,
on detecting that at least part of said clip region is set in a region having a predetermined width from an edge of said input image, the control portion reduces the optical zoom magnification in image sensing performed by the image sensing portion, and
the predetermined width is set based on at least either the amount of change in size of the clip regions that are sequentially set as said clip region or the amount of change in location of the clip regions that are sequentially set as said clip region.

* * * * *